United States Patent [19]
Yamamoto et al.

[11] Patent Number: 5,600,460
[45] Date of Patent: Feb. 4, 1997

[54] METHOD OF REPAIRING A SIGNAL LINE OPEN CIRCUIT BY CONNECTING EACH SIDE OF THE SIGNAL LINE TO AN ADJACENT PIXEL ELECTRODE

[75] Inventors: Hideaki Yamamoto, Tokorozawa; Mitsuo Nakatani, Mobara; Haruo Matsumaru, Hinode-machi; Susumu Niwa, Chonan-machi, all of Japan

[73] Assignee: Hitachi, Ltd., Tokyo, Japan

[21] Appl. No.: 337,394

[22] Filed: Nov. 8, 1994

[30] Foreign Application Priority Data

Nov. 8, 1993  [JP]  Japan .................................. 5-277983
May 30, 1994  [JP]  Japan .................................. 6-116181

[51] Int. Cl.⁶ .................... G02F 1/1343; G02F 1/1333
[52] U.S. Cl. ................................ 349/54; 349/139
[58] Field of Search .................... 345/904; 324/770; 359/54, 59, 79, 87, 88

[56] References Cited

U.S. PATENT DOCUMENTS 4,183,629  1/1980  Nishimura et al. .................... 359/79
4,711,790  12/1987  Morishige .................................. 427/10
4,752,118  6/1988  Johnson .................................. 359/54
5,164,565  11/1992  Addiego et al. ...................... 219/121.6
5,223,961  6/1993  Ukai et al. .............................. 359/59
5,235,272  8/1993  Henley .................................. 345/904

Primary Examiner—Anita Pellman Gross
Assistant Examiner—Walter J. Malinowski
Attorney, Agent, or Firm—Antonelli, Terry, Stout & Kraus

[57] ABSTRACT

A method of manufacturing a liquid crystal display substrate, comprising the step of checking the disconnection of a wiring layer formed on a liquid crystal side face of at least one of the transparent substrates which are arranged to confront each other through a liquid crystal. There is added the step of repairing the disconnection by attaching a conductive material to the disconnected portion of the wiring layer. Thus, the disconnection can be repaired remarkably easily and reliably.

7 Claims, 28 Drawing Sheets

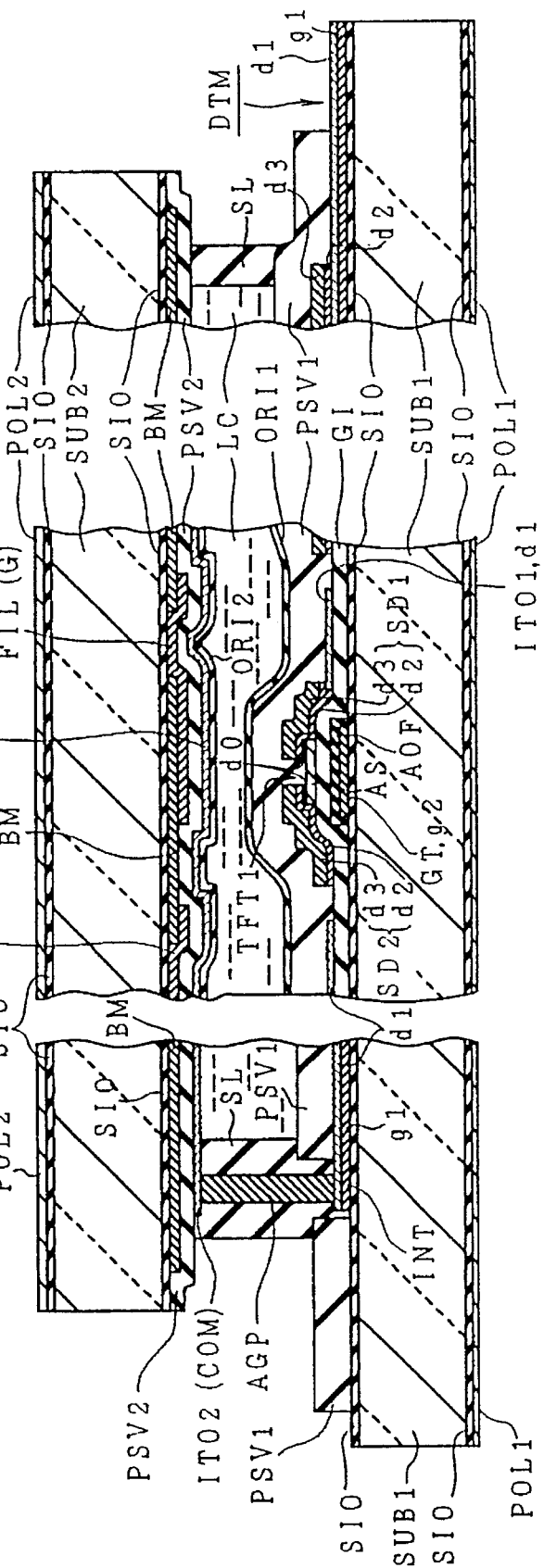

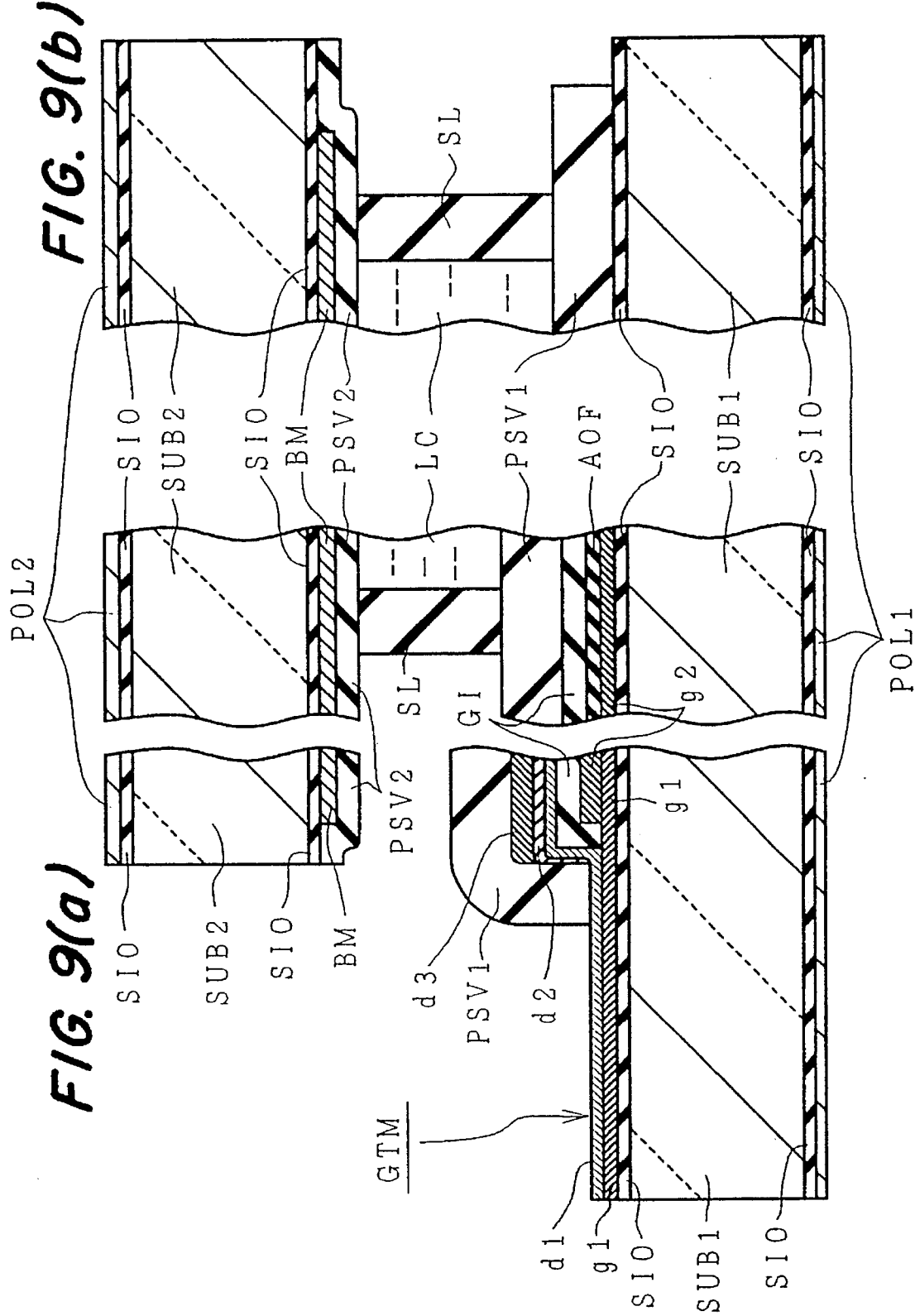

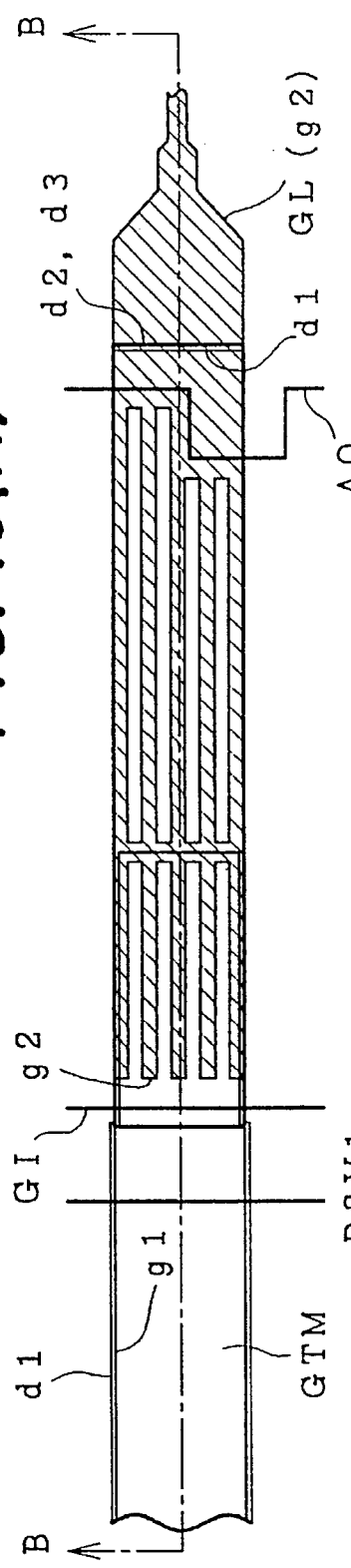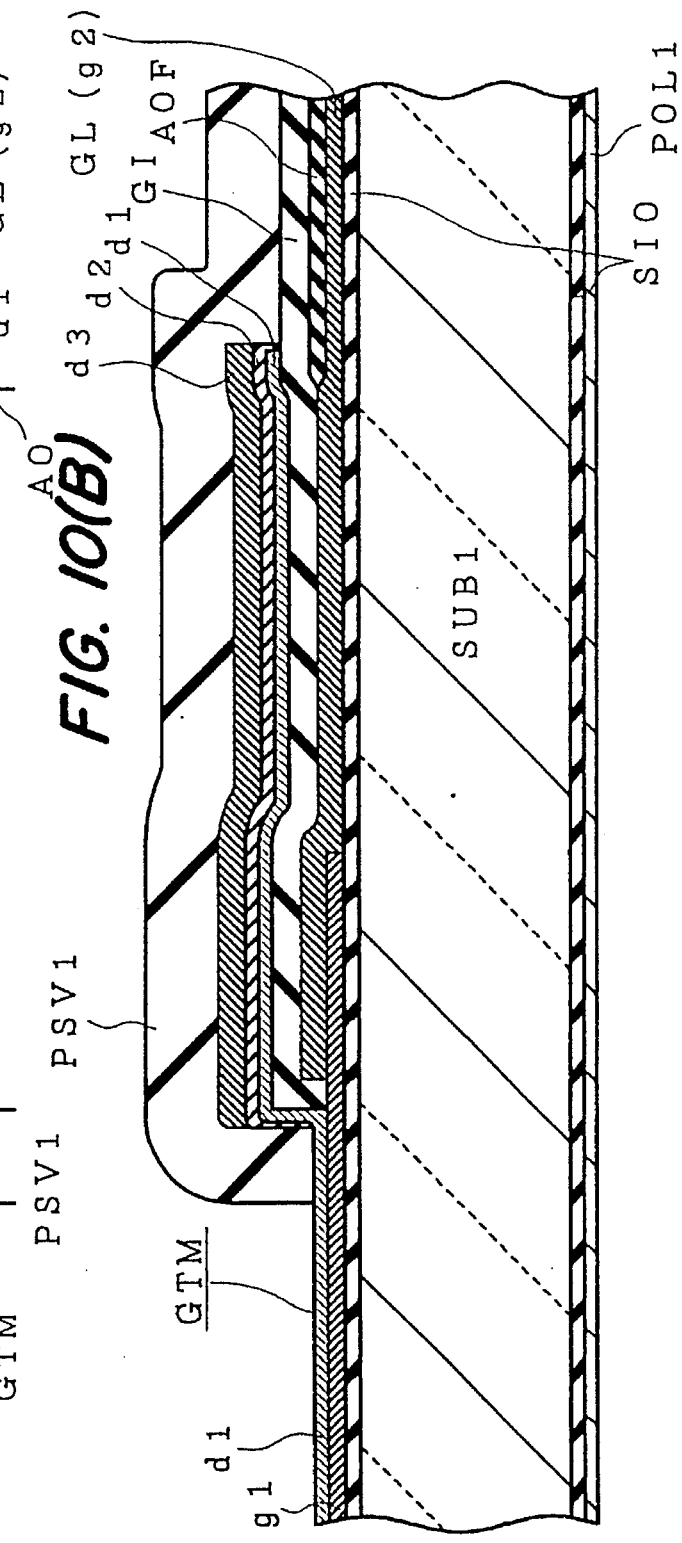
FIG. 10(A)
FIG. 10(B)

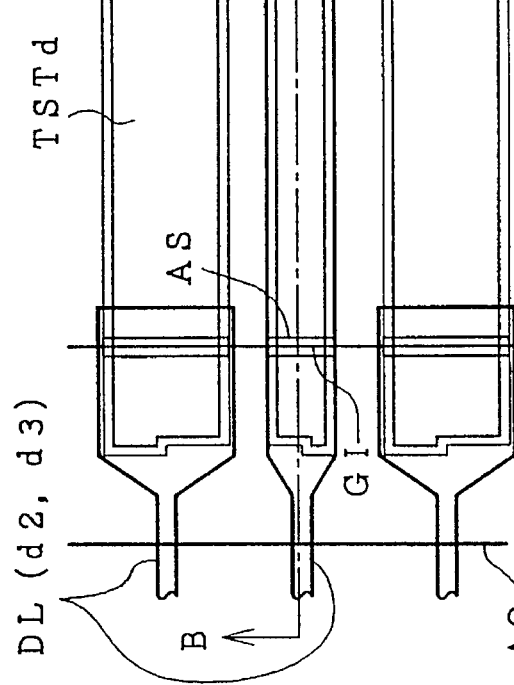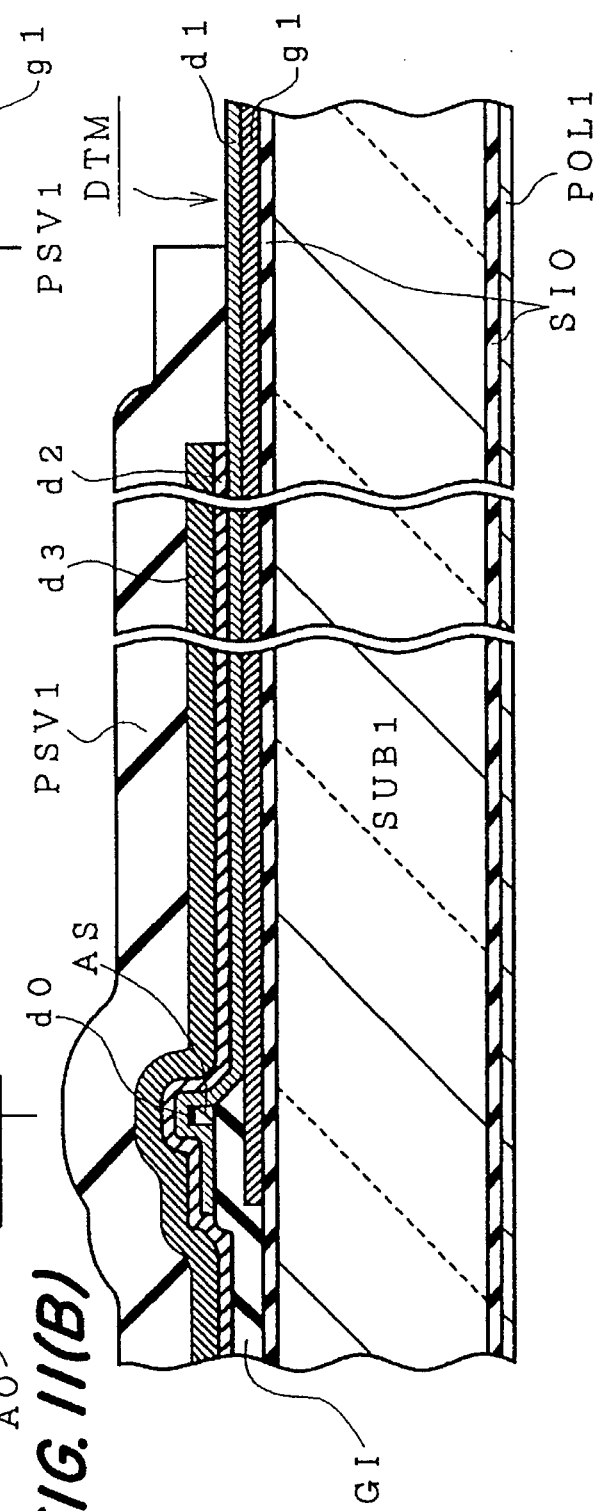

METHOD OF REPAIRING A SIGNAL LINE OPEN CIRCUIT BY CONNECTING EACH SIDE OF THE SIGNAL LINE TO AN ADJACENT PIXEL ELECTRODE

BACKGROUND OF THE INVENTION

1. [Industrial Field of Invention]

The present invention relates to a method of manufacturing a liquid crystal display substrate and, more particularly, to a method of manufacturing a liquid crystal display substrate of active matrix type using a thin film transistor or the like.

2. [Prior Art]

In the liquid crystal display substrate of active matrix type, for example, scanning signal lines extending in the column (or transverse) direction are juxtaposed in the row (or longitudinal) direction, and video signals lines extending in the row (or longitudinal) direction are juxtaposed in the column (or transverse) direction.

Moreover, the individual regions, which are defined by those scanning signal lines and video signal lines, are formed with the pixels which are equipped with switching elements made of thin film transistors or the like.

These switching elements thus juxtaposed in the same column direction are individually turned ON by the voltages which are applied thereto through the adjoining scanning signal lines. At this time, the signal voltages from the video signal lines are applied to the corresponding pixels through the switching elements.

Here, the liquid crystal display device of active matrix type using the thin film transistors is known in Japanese Patent Laid-open No. 309921/1988 or on pp. 193 to 210 of Nikkei Electronics entitled "Active Matrix Type Color Liquid Crystal Display of 12.5 Type Adopting Redundant Construction" and issued on Dec. 15, 1986 by NIKKEI McGRAW-HILL, for example.

In recent years, the liquid crystal display substrate thus composed has a tendency to grow larger and larger in the size and finer and finer in the structure. This tendency increases the probability that the scanning signal lines and the video signal lines are broken during the manufacture.

Therefore, it has been checked in the manufacture of the liquid crystal display substrate whether or not the scanning signal lines and the video signal lines are disconnected.

[Problems that the Invention is to Solve]

If, however, this check reveals that a disconnection has occurred in the scanning signal line or video signal line, this disconnection cannot be repaired so that the substrate is handled in its entirety as the NG.

This is because the simple method of repairing has not been found out before this invention. Another reason is that the repair, if made, has a poor reliability on the repaired disconnection. Moreover, the repaired portion exerts adverse affects upon the liquid crystal to cause an uneven luminance in that portion.

Thus, the present invention has been conceived in view of the background described above and has an object to provide a liquid crystal display substrate manufacturing method capable of repairing a disconnection or short-circuit remarkably easily and reliably.

SUMMARY OF THE INVENTION

In order to achieve this object, the present invention has the following means.

Means 1:
A method of manufacturing a liquid crystal display substrate, comprising the step of checking the disconnection of a wiring layer formed on a liquid crystal side face of at least one of the transparent substrates which are arranged to confront each other through a liquid crystal, wherein the improvement comprises the step of repairing said disconnection by attaching a conductive material to the disconnected portion of said wiring layer.

Means 2:
In Means 1, further comprised is the step of forming a passivation film for covering said wiring layer including said disconnected portion after the repair of tie disconnection.

Means 3:
A method of manufacturing a liquid crystal display substrate, comprising the step of checking the disconnection of a wiring layer covered with an insulating film and formed on a liquid crystal side face of at least one of the transparent substrates which are arranger to confront each other through a liquid crystal, wherein the improvement comprises: the step of selectively removing the insulating film covering the disconnected portion of said wiring layer; and the step of repairing said disconnection by attaching a conductive material to that disconnected portion of the wiring layer, which is exposed from said insulating film.

Means 4:
A method of manufacturing a liquid crystal display substrate, comprising the step of checking the disconnection of a wiring layer covered with an insulating film and formed on a liquid crystal side face of at least one of the transparent substrates which are arranged to confront each other through a liquid crystal, wherein the improvement comprises: the step of selectively removing the insulating film covering the short-circuited portions of said wiring layer and the short-circuited portions of said wiring layer; and the step of covering said short-circuited portions with the insulating film.

Means 5:
In Means 1 or 3, the attachment of said conductive material to the disconnected portions of said wiring layer is carried out by the optical CVD (Chemical Vapoor Deposition) method.

Means 6:
In Means 3, the disconnection repaired portions are covered with the insulating film by the optical CVD method.

Means 7:
In Means 4, the coverage of said short-circuited portions with said insulating film is carried out by the optical CVD method.

Means 8:
An optical CVD apparatus to be used in Means 5 to 7, comprises a microscope having an optical axis aligned to that of the laser beam for illuminating the disconnected portions of said wiring layer.

Means 9:
In Means 5, the disconnection repair is carried out with said transparent substrate being arranged in an optical CVD bell jar.

Means 10:
In Means 5, the short-circuit repair is carried out with said transparent substrate being arranged in an optical CVD bell jar.

Means 11:
In a liquid crystal display substrate including: a plurality of pixel electrodes formed on a liquid crystal face of at least one of the transparent substrates which are arranged to confront each other through a liquid crystal; and a plurality of wiring layers formed between the individual ones of said pixel electrodes, a method of manufacturing a liquid crystal display substrate, comprising: the step of checking whether or not each of said wiring layers is disconnected; and the step of connecting the disconnected portion, which has been confirmed by said checking step, through the adjoining pixel electrodes.

[Function]

According to the construction as defined in Means 1, the repair is carried out by attaching the conductive material to the disconnected portion, so that the disconnection can be repaired remarkably simply and reliably by the local treatment.

According to the construction as defined in Means 2, the disconnected portion to be repaired is protected by the passivation film, so that the reliability of the later quality can be ensured.

According to the construction as defined in Means 3, even the wiring layer, if covered with the insulating film, can be reproducibly repaired by the local treatment.

According to the construction as defined in Means 4, even the short-circuited wiring layer can be repaired remarkably simply and reliably by the local treatment.

According to the construction as defined in Means 5, the conductive material can be attached in the fine pattern to ensure the reliable repair.

According to the construction as defined in Means 6, the reproducibility after the repair can be effected for the similar reason.

According to the construction as defined in Means 7, the reproducibility of the repair can be effected even for the short-circuit.

According to the construction as defined in Means 8, the portion to be repaired and the laser beam for the repair can be reliably aligned to each other.

According to the construction as defined in Means 9, the disconnection can be repaired by using the optical CVD apparatus having an ordinary size.

According to the construction as defined in Means 10, the short-circuit can be repaired by using the optical CVD apparatus having an ordinary size.

According to the construction as defined in Means 11, the conductive film can be formed in the region avoiding the disconnected portion of the signal line by connecting through the adjoining pixel electrodes.

As a result, the connection can be repaired by forming the conductive film in the region having no impure residual to improve the reliability drastically.

BRIEF DESCRIPTION OF THE DRAWINGS

FIGS. 8(a)–8(c) are sections showing the pixel portion of a matrix at the center and the vicinity of a panel corner and the vicinity of a video signal terminal portion at the two sides;

FIGS. 9(a)–9(b) are sections showing panel edge portions with and without a scanning signal terminal at the lefthand and righthand sides;

FIGS. 10(A)–10(B) present a top plan view and a section showing the vicinity of a connecting portion between a gate terminal GTM and a gate signal line GL;

FIGS. 11(A)–11(B) present a top plan view and a section showing the vicinity of a connecting portion between a gate terminal GTM and a gate signal line DL;

DESCRIPTION OF THE PREFERRED EMBODIMENTS

[Embodiment]

Figure 1A:
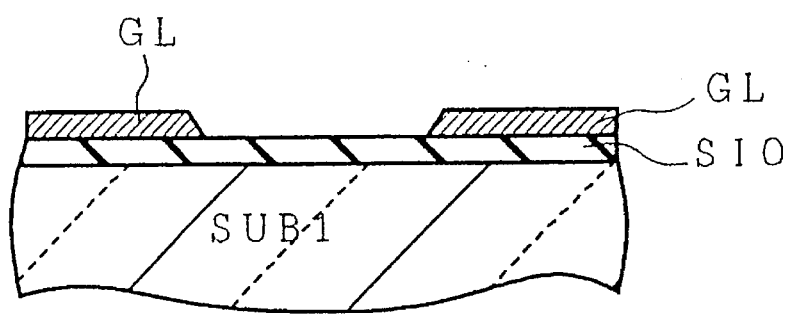
FIGS. 1(a)–(c) are process diagrams showing one embodiment of a process for manufacturing a liquid crystal display substrate according to the present invention.

The present invention, other objects of the present invention, and other features of the present invention will become apparent from the following description to be made with reference to the accompanying drawings.

<<Active Matrix Liquid Crystal Display Device>>

Here will be described in the following the construction of the present invention in connection with embodiments of a color liquid crystal display device of active matrix type, to which is applied the present invention. Incidentally, the parts having identical functions are designated at identical reference characters throughout all the Figures for describing the embodiments, and their repeated descriptions will be omitted.

<<Summary of Matrix Portion>>

Figure 2:
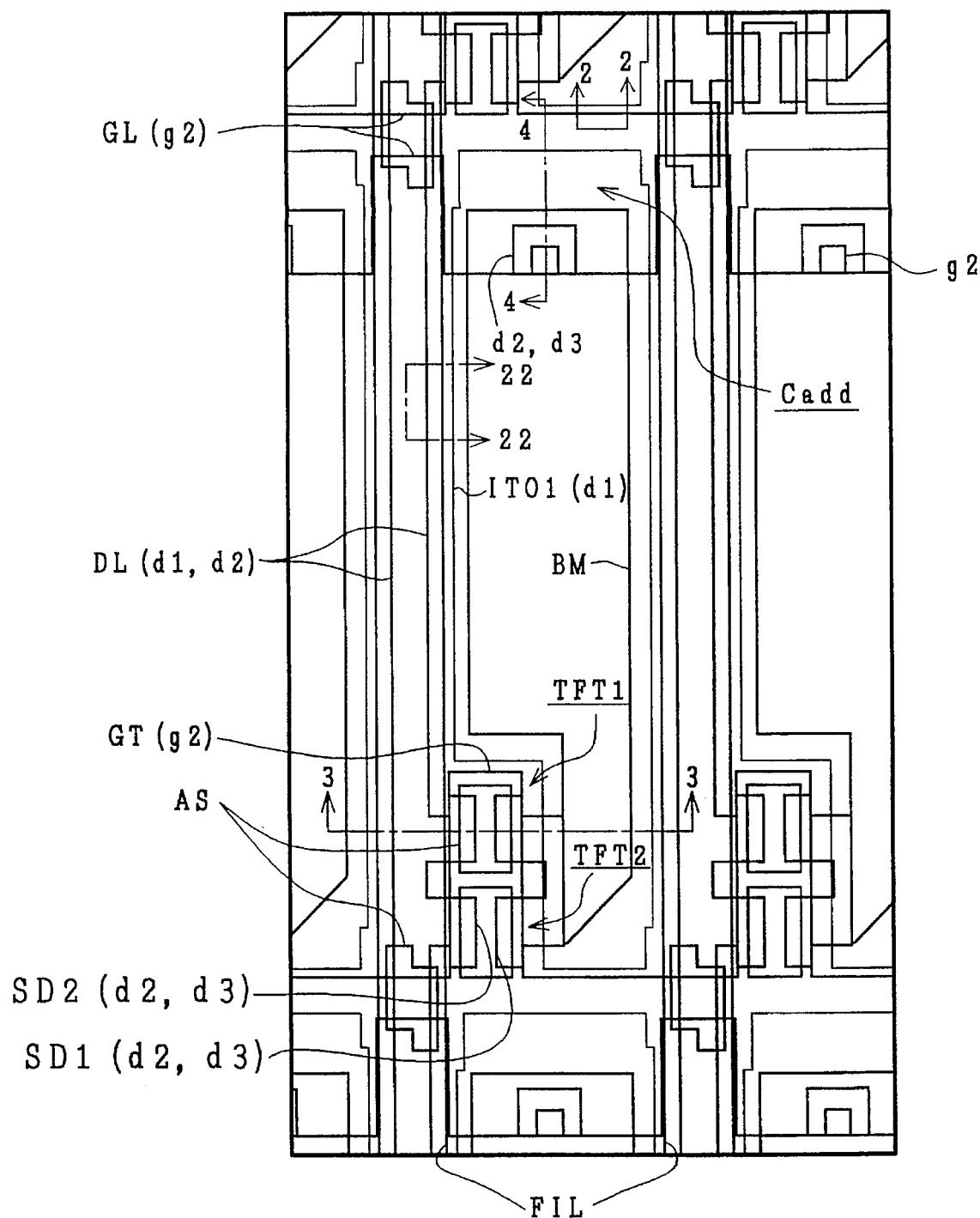
FIG. 2 is a top plan view an essential portion showing one pixel and its periphery of a liquid display portion of a color liquid crystal display device of active matrix type to which is applied the present invention.
Figure 3:
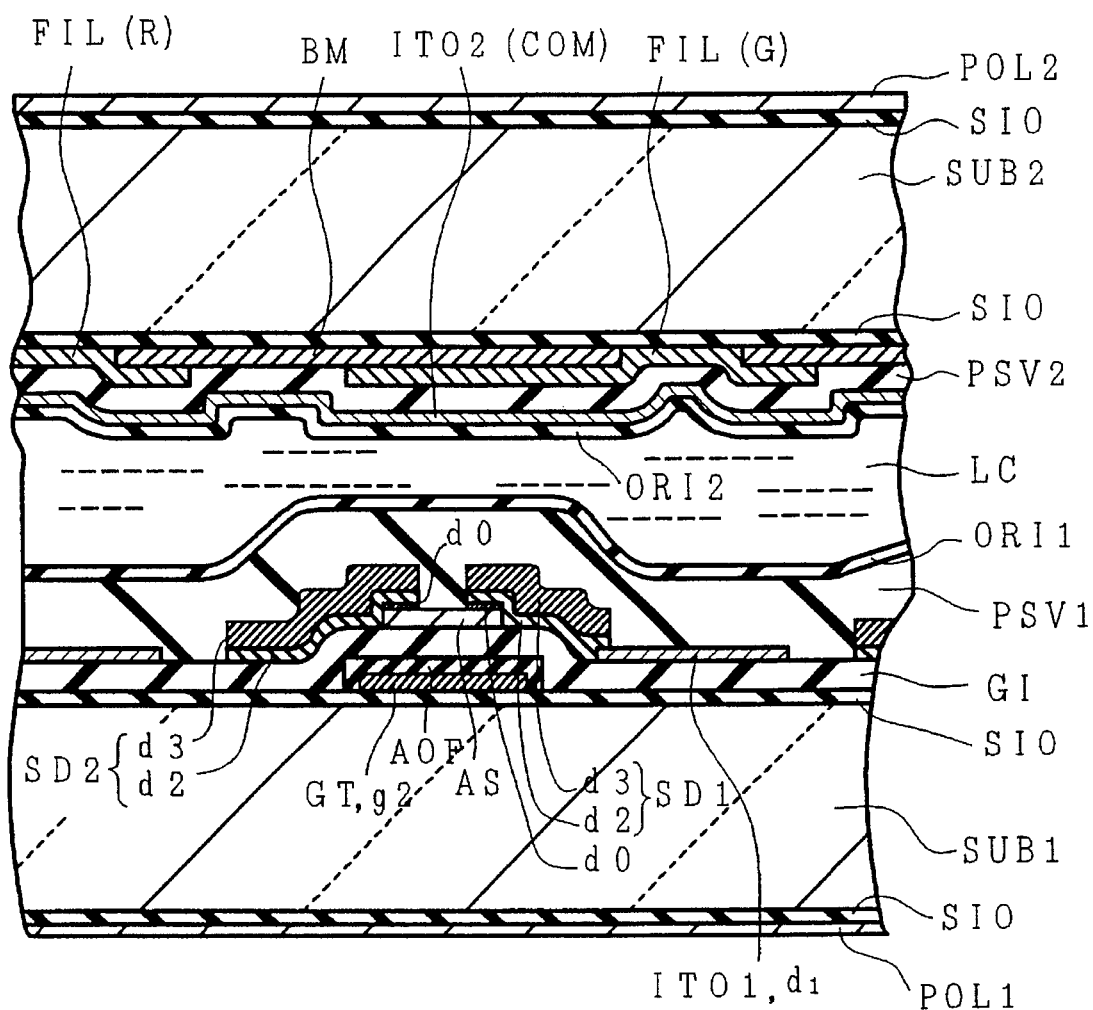
FIG. 3 is a section taken along line 3—3 of FIG. 2 and shows one pixel and its peripheral portion.
Figure 4:
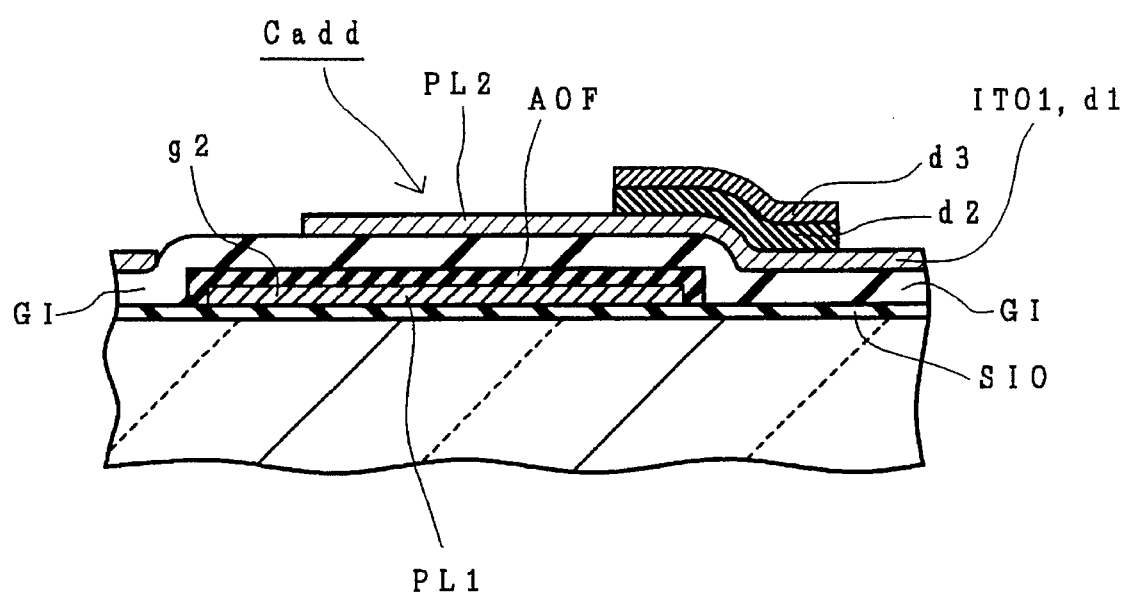
FIG. 4 is a section taken along line 4—4 of FIG. 2 and shows an additional capacitor Cadd.

FIG. 2 is a top plan view showing one embodiment of one pixel and its peripheral portion of the active matrix type color liquid crystal display device to which is applied the present invention. FIG. 3 is a section taken along line 3—3 of FIG. 2. FIG. 4 is a section taken along line 4—4 of FIG. 2.

As shown in FIG. 2, each pixel is arranged in a cross region (defined by four signal lines) between two adjacent scanning signal lines (gate signal lines or horizontal signal lines) GL and two adjacent video signal lines (drain signal lines and vertical signal lines) DL. Each pixel includes a thin film transistor TFT, a transparent pixel electrode ITO1, and a latching capacitor Cadd. The scanning signal lines GL extend in the lateral direction and are parallelly arranged in the vertical direction. The video signal lings DL extend in the vertical direction and are parallelly arranged in the lateral direction.

As shown in FIG. 3, the thin film transistor TFT and the transparent pixel electrode ITO1 are formed at the side of a lower transparent glass substrate SUB1 across a liquid crystal layer LC, and a color film FIL and a back matrix pattern BM for light shielding are formed at the side of an upper transparent glass substrate SUB2. The side of the lower transparent glass substrate SUB1 is made to have a thickness of about 1.1 mm, for example. On the both surfaces of the transparent glass substrates SUB1 and SUB2, there are formed silicon oxide layers SIO which are deposited by the dip treatment.

On the surface of the upper transparent glass substrate SUB2 at the inner side (or the side of the liquid crystal LC), there are sequentially laminated the light-shielding film BM, the color filter FIL, a passivation film PSV2, a common transparent pixel electrode ITO2 (or COM) and an upper orientation film ORI2.

<<Summary of Matrix Periphery>>

Figure 5:
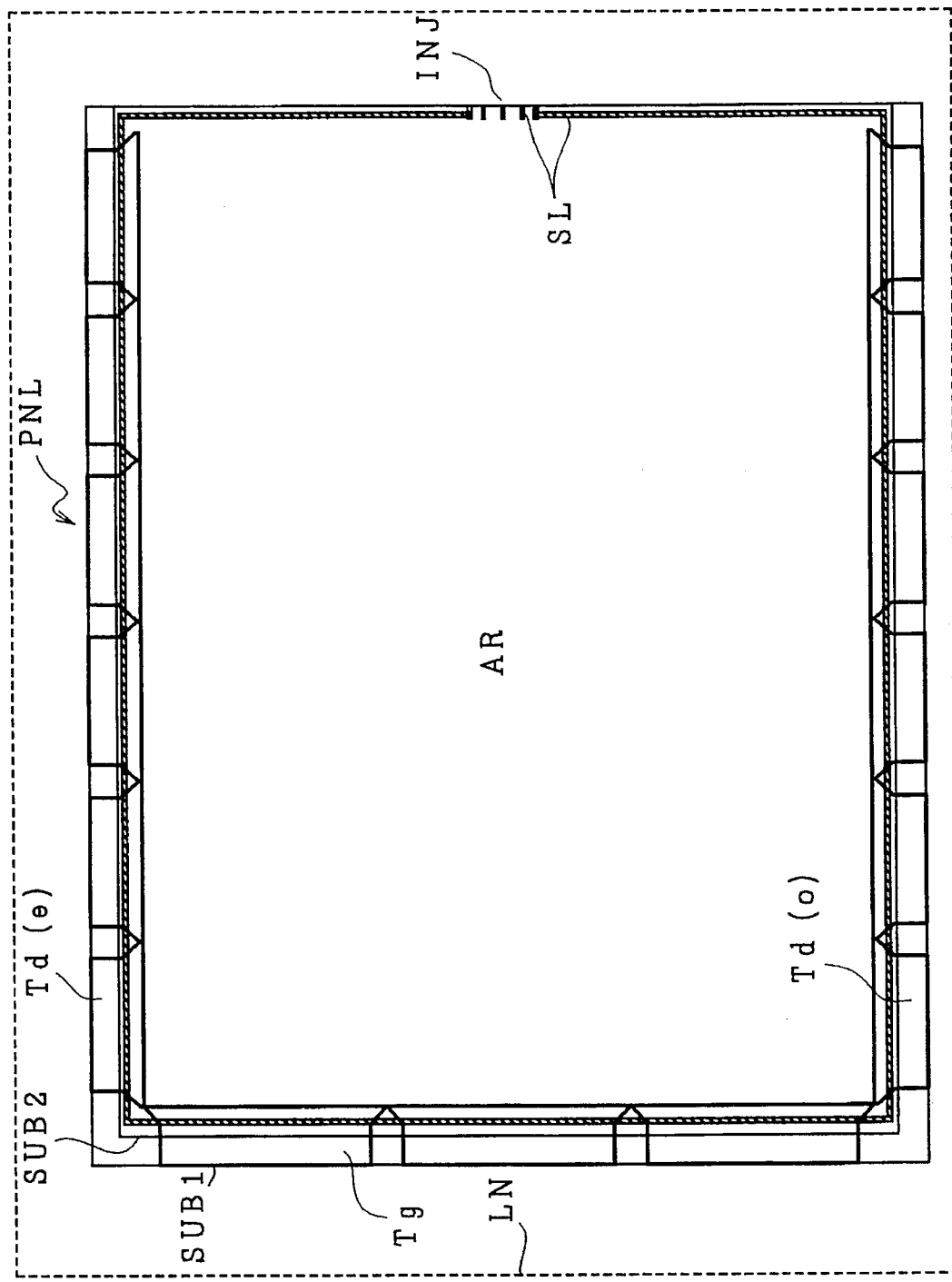
FIG. 5 is a top plan view for explaining the construction a matrix peripheral portion of a display panel.
Figure 6:
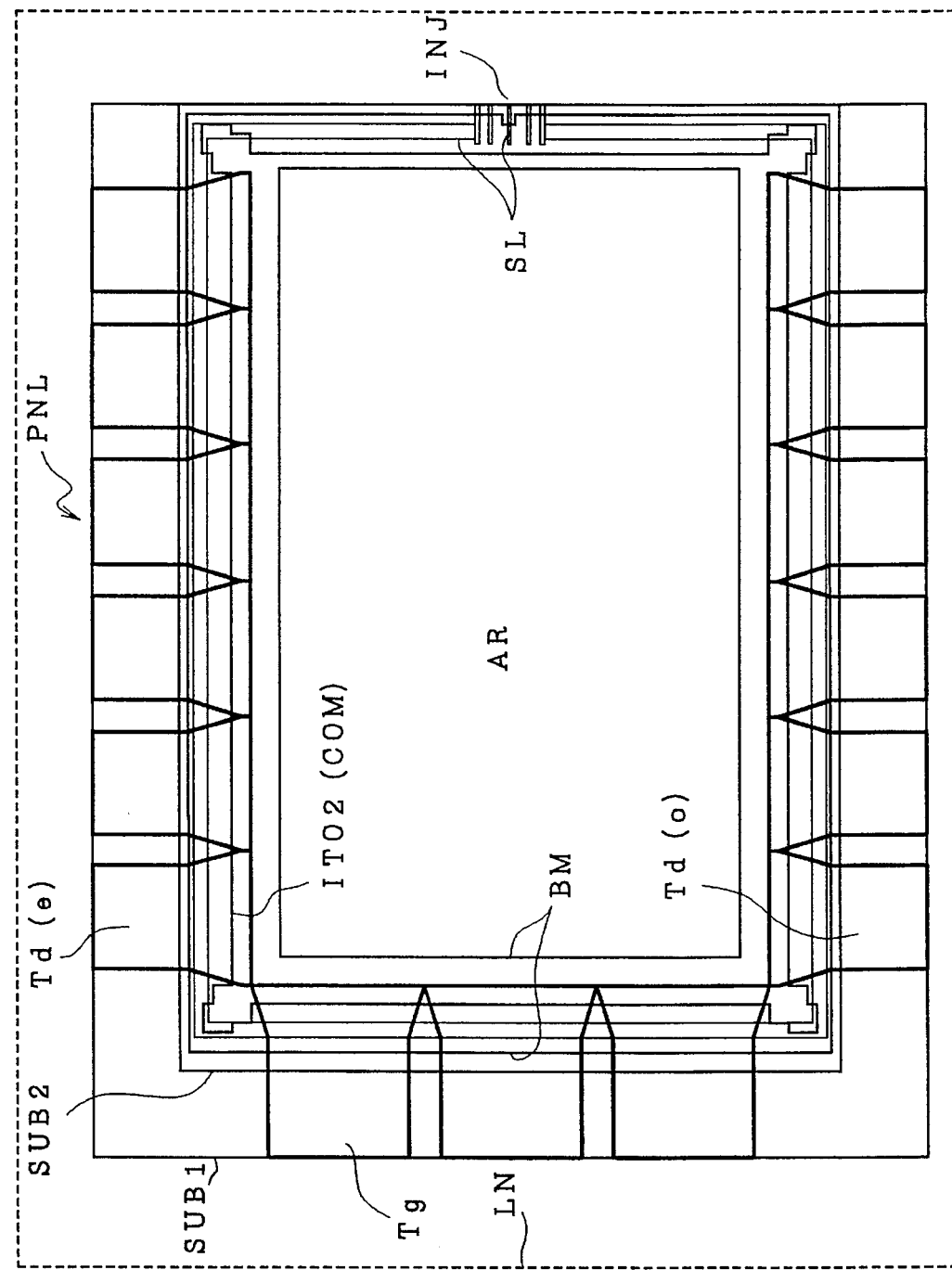
FIG. 6 is a panel top plan view for exaggerating and explaining the peripheral portion of FIG. 5 more specifically.
Figure 7:
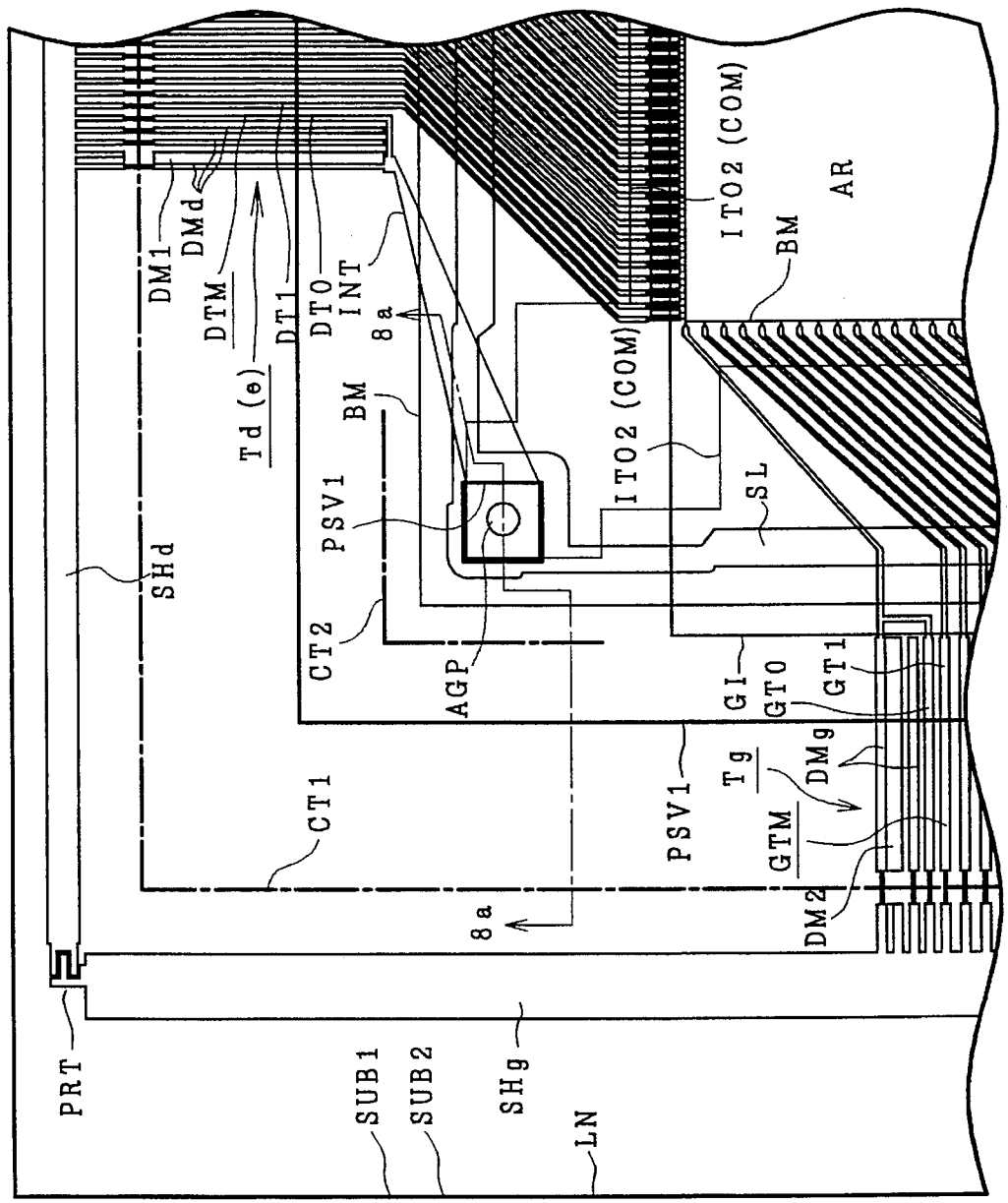
FIG. 7 is an enlarged top plan view showing a corner of a display panel including an electric connection portion of upper and lower substrates.

FIG. 5 is a top plan view showing an essential portion of the periphery of a matrix (AR) of a display panel PNL including the upper and lower glass substrates SUB1 and SUB2. FIG. 6 is a top plan view further exaggerating the peripheral portion. FIG. 7 is an enlarger top plan view showing the vicinity of a seal portion SL corresponding to the lefthand upper corner of the panel of FIGS. 5 and 6. Moreover, FIG. 8 presents a section of FIG. 2 at the lefthand side, a section taken from line 8a–9a of FIG. 7 at the righthand side, and a section showing the vicinity of an external connection terminal DTM, to which is connected a video signal drive circuit. Likewise, FIG. 9 presents a section showing the vicinity of an external connection terminal GTM, to which is connected a scanning circuit, at the lefthand side and a section showing the vicinity of a seal portion having no external connection terminal at the righthand side.

Figure 18:
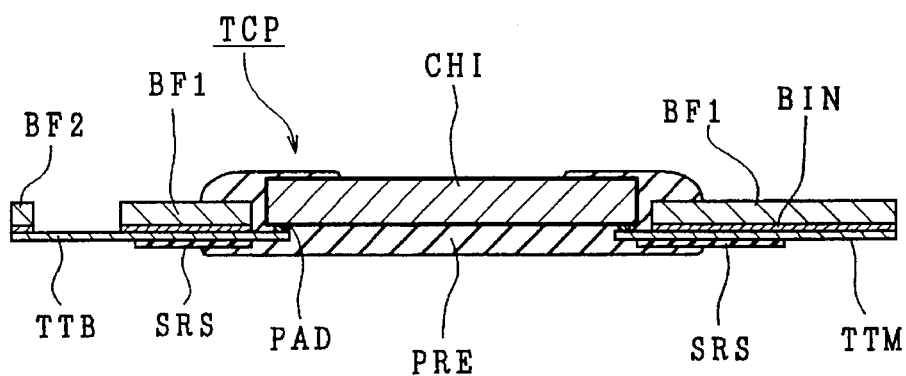
FIG. 18 is a section showing a structure of a tape carrier package TCP, in which an integrated circuit chip CHI constituting a drive circuit is mounted on a flexible wiring substrate.
Figure 19:
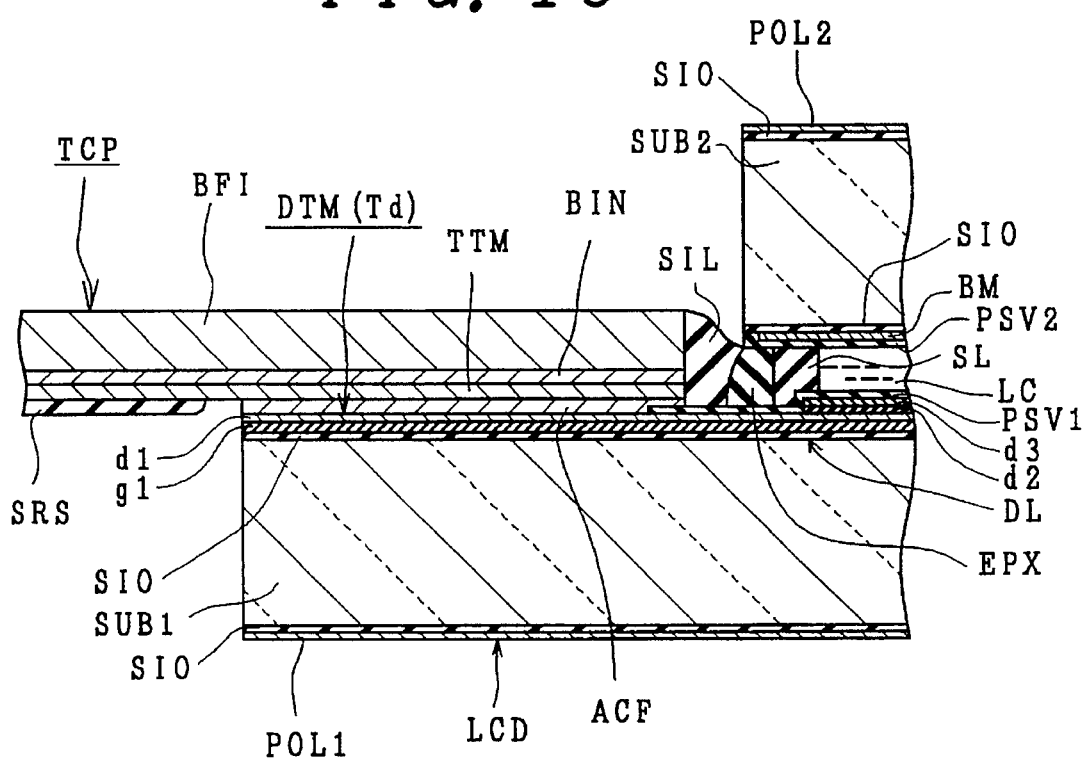
FIG. 19 is a section showing the state of an essential portion, in which the tape carrier package TCP is connected with a video signal circuit terminal DTP of a liquid crystal display panel PNL.

In a fabrication of this panel, a plurality of devices are simultaneously worked and divided by a signal sheet of glass substrate so as to improve the throughput, if the panel has a small size, but a glass substrate having a standardized size for any kind is worked and is reduced to the sizes matching the individual kinds so as to share the fabrication facilities, if the size is large. In either case, the glass is cut after a series of steps. In FIGS. 5 to 7 showing the latter example, FIGS. 5 and 7 show the state after the upper and lower substrates SUB1 and SUB2 have been cut, and FIG. 7 shows the state before the cutting operation. Letters LN designate the edges of the two substrates before the cutting operation, and characters CT1 and CT2 designates the individual positions at which the substrates SUB1 and SUB2 are to be cut. In either case, the size of the upper substrate SUB2 is so limited to the inside of the lower substrate SUB1 that the portions (as located at the upper and lower sides and the lefthand side in the Figures), in which external connection terminal groups Tg and Td (although suffixes are omitted) are present in the completed state, may be exposed to the outside. The terminal groups Tg and Td are named such that the scanning line connecting terminal GTM, the video signal circuit connecting terminal DTM and their leading lines are collected in plurality at the unit of a tape carrier package TCP (as shown in FIGS. 18 and 19) on which is packaged an integrated circuit chip CHI. The leading line from the matrix portion of each group to the external connection terminal portion is inclined toward the two ends. This is because the terminals DTM and GTM of the display panel PNL are made to match the array pitch of the package TCP and the connection terminal pitch at each package TCP.

Between and along the edges of the transparent glass plates SUB1 and SUB2, there is formed the seal pattern SL for sealing the liquid crystal LC excepting a liquid crystal entrance INJ. The seal material is made of an epoxy resin, for example. The common transparent pixel electrode ITO2 at the side of the upper transparent glass substrate SUB2 is connected at the four corners in the present embodiment with a leading line INT, which is formed at the side of the lower transparent glass substrate SUB1, in at least one portion by a silver paste material AGP. The leading line INT is formed at the same fabrication step as that of the later-described gate terminal GTM and drain terminal DTM.

The orientation film ORI1 and ORI2, the transparent pixel electrode ITO1, the common transparent pixel electrode ITO2, and the individual layers are formed in the seal pattern SL. Polarization plates POL1 and POL2 are individually formed on the outer surfaces of the lower transparent glass substrate SUB1 and the upper transparent glass substrate SUB2. The liquid crystal LC is filled in the region which is defined by the seal pattern SL between the lower orientation film ORI1 and the upper orientation film ORI2 for setting the orientations of the liquid crystal molecules. The lower orientation film ORI1 is formed over a passivation film PSV1 at the side of the lower transparent glass substrate SUB1.

This liquid crystal display device is assembled: by superposing the individual layers at the sides of the lower transparent glass substrate SUB1 and the upper transparent glass substrate SUB2; by forming the seal pattern SL at the side of the substrate SUB2; by superposing the lower transparent glass substrate SUB1 and the upper transparent glass substrate SUB2; by injecting the liquid crystal LC from the opening INJ of the seal member SL to seal the injection entrance INJ with the epoxy resin or the like; and by cutting the upper and lower substrates.

<<Thin Film Transistor TFT>>

Next, returning to FIG. 2 and FIG. 3, we will explain the configuration on the TFT substrate SUB1 side in detail.

If a positive bias is applied to the gate electrode GT, the thin film transistor TFT has its channel resistance reduced between its source and drain. If the bias is reduced to zero, the thin film transistor TFT operates to have its channel resistance increased.

Each pixel is provided with a redundant number (two) of thin-film transistors TFT1, TFT2. These two thin-film transistors TFT1, TFT2 are formed to have substantially the same sizes (in channel length and width) and are each composed of a gate electrode GT, a gate insulating film GI, an i-type (i.e., intrinsic type not doped with a conductivity type determining impurity) amorphous silicon (Si) semiconductor layer AS, and a pair of source electrode SD1 and drain electrode SD2. The source and drain are intrinsically determined by the bias polarity between them, and this polarity is inverted during the operation in the circuit of the present display device. Thus, it should be understood that the source and drain are interchanged daring the operation. In the following description, however, one is fixed as the source whereas the other is fixed as the drain, for convenience sake.

<Gate Electrode GT>>

The gate electrode GT is formed to project perpendicularly from the scanning signal lines GL (or branched in the "T-shape"). The gate electrode GT is extended to the regions to be individually formed with the thin film transistors TFT1 and TFT2. These thin film transistors TFT1 and TFT2 have their individual gate electrodes GT integrated (as their common gate electrode) to merge into the scanning signal line GL. The gate electrode GT is constituted by the single level conductive layer g2. The second conductive film g2 may be an aluminum (Al) film formed, for example, by sputtering. On this film is formed an anodized oxide film AOF of aluminum.

This gate electrode GT is formed slightly larger than the i-type semiconductor layer AS so that it can cover it completely (when viewed from below). This prevents the i-type semiconductor layer AS from being exposed to external light or backlight.

<<Scanning Signal Line GL>>

The scanning signal line GL is constituted by the second conductive film g2. The second conductive film g2 of the scanning signal line GL is formed at the same step as and integrally with the second conductive film g2 of the gate electrode GT. Moreover, the scanning signal line GL is also formed thereon with the anodized oxide film AOF of Al.

<<Insulating Film GI>>

The insulating film GI is used as a gate insulating film to apply an electric field to the semiconductor layer AS as well as the gate electrode in the thin-film transistors TFT1, TFT2. The insulating film GI is formed over the gate electrode GT and the scanning signal line GL. The insulating film GI may be formed of a silicon nitride film prepared by the plasma CVD which has a thickness from 200Å to 2200Å (in this embodiment approximately 2000Å). The gate insulating film GI, as shown in FIG. 7, is formed to cover the entire matrix section AR and is removed at its periphery to expose the external connection terminals DTM and GTM. The insulating film GI also contributes to electrical insulation of the scanning signal line GL and video signal line DL.

<<i-Type Semiconductor Layer AS>>

The i-type semiconductor layer AS is formed as an isolated island in each of the thin-film transistors TFT1, TFT2 and is made of an amorphous silicon in the thickness range of between 200Å and 2200Å (in this embodiment about 2000Å). The layer d0 is an N(+) type amorphous silicon semiconductor layer doped with phosphor (P) for ohmic contact. This layer remains only where there is an underlying i-type semiconductor layer AS and an overlying conductive layer d2 (d3).

The i-type semiconductor layer As is also formed between the intersecting portions (or crossover portions) of the scanning signal line GL and the video signal line DL. This crossover i-type semiconductor layer As is formed to reduce the short-circuiting between the scanning signal line GL and the video signal line DL at the intersecting portion.

<<Transparent Pixel Electrode ITO1>>

The transparent pixel electrode ITO1 constitutes one of the parts of a pixel electrode of a liquid crystal display.

The transparent pixel electrode ITO1 is connected with both the source electrode SD1 of the thin film transistor TFT1 and the source electrode SD1 of the thin film transistor TFT2. Even if, therefore, one of the thin film transistors TFT1 and TFT2 become defective, a suitable portion may be cut by a laser beam in case the defect invites an adverse action. Otherwise, the situation may be left as it is because the other thin film transistor is normally operating.

The transparent pixel electrode ITO1 is formed of a first conductive film d1, which is mace of a transparent conductive film (Indium-Tin-Oxide (ITO) or NESA film) by sputtering in the thickness range between 1000Å and 2000Å (in this embodiment about 1400Å).

<<Source Electrode SD1, Drain Electrode SD2>>

The source electrode SD1 and the drain electrode SD2 are each formed of a second conductive film d2 in contact with the N(+) type semiconductor layer d0 and a third conductive film d3 formed over the second conductive film d2.

The second conductive film d2 is a sputtered chromium (Cr) film with a thickness of 500 to 1000Å (in this embodiment about 600Å). The Cr film is formed in the thickness range not exceeding approximately 2000Å because too thick a film will increase stresses. The Cr film is used as a barrier layer to improve the adhesion of the third conductive film d3 to the N(+) type semiconductor layer d0 and prevent the aluminum of the third conductive film d3 from diffusing into the N(+) type semiconductor layer d0. As the second conductive film d2, it is possible to use high melting point metal (Mo, Ti, Ta, W) films and their silicide ($MOSi_2$, $TiSi_2$, $TaSi_2$, $WSi_2$) films, in addition to the Cr film.

The third conductive film d3 is formed by aluminum sputtering to a thickness of 3000Å to 5000Å (in this embodiment 4000Å). The aluminum (Al) film has smaller stresses than the Cr film and thus can be formed to a greater thickness, reducing resistance of the source electrode SD1, drain electrode SD2 and video signal line DL, and ensuring a reliable pass over stepped geometry produced by gate electrode GT and i-type semiconductor layer AS. (In other words, it improves a step coverage.)

After the second conductive film d2 and the third conductive film d3 have been patterned with the same mask, and the N(+) type semiconductor layer d0 is removed by using the same mask or the second conductive film d2 and the third conductive film d3. In other words, the N(+) type semiconductor layer d0 left on the i-type semiconductor layer AS is removed at the portions other than the second conductive fill d2 and the third conductive film d3 by the self-alignment. Since, at this time, the N(+) type semiconductor layer d0 is etched off all its thickness, the i-type semiconductor layer AS also has its surface portion etched, but this etching degree may be controlled by the etching time.

<<Video Signal Line DL>>

The video signal line DL is formed of the second conductive film d2 and third conductive film d3, the same layers as the source electrode SD1 and drain electrode SD2.

<<Passivation Film PSV1>>

Over the thin film transistor TFT and the transparent pixel electrode ITO1, there is formed the passivation film PSV1, which is provided mainly for protecting the thin film transistor TFT against humidity or the like. Thus, the passivation film PSV1 to be used is highly transparent and humidity resistant. The passivation film PSV1 is formed of a silicon oxide film or a silicon nitride film by the plasma CVD apparatus, for example, to have a thickness of about 1 μm.

The passivation film PSV1 is formed, as shown in FIG. 7, to enclose the entirety the matrix portion AR and is removed at its peripheral portion to expose the external connection terminals DTM and GgM to the outside and at the portion, in which the common electrode COM at the side of the upper substrate SUB2 is connected with the external connection terminal connecting leading line INT of the lower substrate SUB1 by means of the silver paste AGP. In connection with the thickness connection between the passivation film PSV1 and the gate insulating film CI, the former is made thick considering the passivation effect whereas the latter is made thin considering the mutual conductance gm of the transistor. As a result, as shown in FIG. 7, the passivation film PEV1 having a high passivation effect is made so larger than the gate insulating film GI as to have its peripheral portion passivated as wide as possible.

<<Shielding Film BM>>

On the upper transparent glass substrate SUB2 side, a shielding film BM is provided that prevents external light or backlight from entering the i-type semiconductor layer AS. A closed polygonal outline of the shielding film BM shown in FIG. 2 represents an opening inside of which no shielding film BM will be formed. The shielding film is formed of aluminum or chromium which has good light shielding characteristic. In this embodiment, it is a chromium film formed by sputtering to a thickness of about 1300Å.

Therefore, the i-type semiconductor layer AS of thin-film transistors TFT1, TFT2 is sandwiched with the overlying shielding film BM and the underlying, slightly larger gate electrode GT, and is shielded against external natural light and backlight. The shielding film BM is formed around each pixel in a lattice shape (so-called black matrix). This lattice defines the effective display region for each pixel. Because the contour of each pixel is clearly defined by the shielding film BM, the contrast improves. In other words, the shielding film BM has two functions of blocking light from entering the i-type semiconductor layer AS and serving as a black matrix.

Since the edge portion of the transparent pixel electrode ITO1 on the foot side of the rubbing direction (lower right portion in FIG. 2) is also shielded by the shielding film BM, even if a domain is induced at the above portion, the display characteristic will not deteriorate because the domain is not seen.

The shielding film BM is additionally formed at its peripheral portion with a framed pattern, as shown in FIG. 6, which is formed to merge into the pattern of the matrix portion having a plurality of dot-shaped openings, as shown in FIG. 2. The shielding film BM at the peripheral portion is extended to the outside of the seal portion SL, as shown in FIGS. 6 to 9, thereby to prevent the leakage light such as the light reflected from an implemented machine such as a personal computer from entering the matrix portion. On the other hand, the shielding film BM is limited to the inside of the edge of the substrate SUB2 within about 0.3 to 1.0 mm and is formed to avoid the cut region of the substrate SUB2.

<<Color Filter FIL>>

The color filters FIL are formed in stripes of repeating colors-red, green and blue-at positions facing each pixel. The color filter FIL is formed large enough to cover the entire transparent pixel electrode ITO1, and the shielding film BM is formed inside the periphery of the transparent pixel electrode ITO1 so that it overlaps the edge portions of the color filter FIL and the transparent pixel electrode ITO1.

The color filter FIL may be formed as follows. First, a dyeing base such as acrylic resin is formed over the surface of the upper transparent glass substrate SUB2. The dyeing base in areas other than those where red filter will be formed is removed by photolithography. Then, the remaining dyeing base is dyed with red dye and fixed to form a red filter R. Similar steps are followed to subsequently produce a green filter C and a blue filter B.

<<Passivation Film PSV2>>

The passivation film PSV2 is provided for preventing dyes of color filters FIL from leaking into the liquid crystal LC. The passivation film PSV2 may use such transparent resin materials as acrylic resin and epoxy resin.

<<Common Transparent Pixel Electrode ITO2>>

The common transparent pixel electrode ITO2 is opposed to the transparent pixel electrode ITO1, which is provided for each pixel at the side of the lower transparent glass substrate SUB1, so that the liquid crystal LC has its optical state varied in response to the potential difference (or electric field) between each pixel electrode ITO1 and the common transparent pixel electrode ITO2. This common transparent pixel electrode ITO2 is fed with the common voltage Vcom. In the present embodiment, this common voltage Vcom is set at an intermediate potential between a driving voltage Vdmin at the low level and a driving voltage Vdmax at the high level, both of which are applied to the video signal line DL. An AC voltage may be applied in case the supply voltage of the integrated circuit to be used in the video signal drive circuit is to be reduced to one half. Incidentally, the top plan shape of the common transparent pixel electrode ITO2 should be referred to FIGS. 6 and 7.

<<Structure of Latching Capacitor Cadd>>

The transparent pixel electrode ITO1 is formed to overlap the adjoining scanning signal line GL at the end opposed to the end to be connected with the thin film transistor TFT. This superposition constitutes a latching capacity element (or an electrostatic capacity element) Cadd which uses the transparent pixel electrode ITO as its one electrode PL2 and the adjoining scanning signal line GL as its other electrode PL1, as is apparent from FIGS. 4. This latching capacity element Cadd has its dielectric films formed of: the insulating film GI used as the gate insulating film of the thin film transistor TFT; and the anodized film AOF.

The latching capacitor Cadd is formed in the widened portion of the second conductive layer g2 of the scanning gate line GL. Here, the second conductive film g2 at the portion intersecting the video signal line DL is thinned to reduce the probability of the short-circuiting with the video signal line DL.

Even if the transparent pixel electrode ITO1 is broken at the stepped portion of the electrode PL1 of the latching capacitor Cadd, its defect is compensated by the island region which is constructed of the second conductive film d2 and the third conductive film d3 formed cross that step.

<<Gate Terminal Portion>>

FIG. 10 presents a connection structure from the scanning signal line GL of the display matrix to its external connection terminal GTM, and (A) is a top plan view whereas (B) is a section taken along line B—B of (A). Incidentally, FIG. 9 corresponds to the lower portion of FIG. 7, and the hatched line portions are shown by straight lines for conveniences.

Letters AO designate a photolithographic mask pattern, namely, a photo resist pattern for selective anodization. As a result, this photo resist is anodized and then removed so that the shown pattern AO is not left as a complete but as a trace because the oxide film AOF is selectively formed in the gate line GL, as shown in section. With reference to the boundary line AO of the photoresist in the top plan view, the lefthand side is the region which is covered with the resist and is not anodized, whereas the righthand side is the region which is exposed from the resist to the outside and is anodized. The anodized al layer g2 has its surface formed with its oxide $Al_2O_3$ film AOF and its lower conductive portion reduced in volume. Of course, the anodization is so carried out for a proper time and at a proper voltage that the conductive portion may be left. The mark pattern AO is made to intersect the scanning line GL not in a straight line but in a folded crank shape.

The Al layer g2, as shown, is hatched for easy understanding, but the region left non-anodized is patterned in a comb shape. This is intended to suppress the probability of the line breakage and the sacrifice of the conductivity to the minimum while preventing any formation of whiskers by narrowing the width or each Al layer and bundling a plurality of them in parallel, because the whisker will occur in the surface for the wide Al layers. In the present embodiment, therefore, the portion corresponding to the root of the comb is displaced along the mask AO.

The gate terminal GTM is formed of: a Cr layer g1 having an excellent contact with the silicon oxide SiO layer and a higher resistance to galvanic corrosion than Al or the like; and the transparent conductive layer d1 protecting the surface of the Cr layer g1 and having the same level (belonging to the same layer and formed simultaneously) as the pixel electrode ITO1. Incidentally, the conductive layers d2 and d3 formed over and on the sides of the gate insulating film GI are left as a result that the conductive layers g2 and g1 are covered with the photo resist so that they may not be etched off by pin holes or the like at the time of etching the conductive layers d3 and d2. Moreover, the ITO layer d1 extended rightward across the gate insulating film GI is provided for further completing the similar countermeasures.

In the top plan view, the gate insulating film GI is formed at the more righthand side than its boundary, and a passivation film PSV1 is also formed at the more righthand side than the boundary so that the terminal portion GTM at the lefthand side can be exposed from them into electric contact with the external circuits. Although only one pair of the gate line GL and the gate terminal is shown, a plurality of pairs are arranged vertically in FIG. 7, as a matter of fact, to constitute the terminal group Tg (as shown in FIGS. 6 and 7), and the gate terminals have their lefthand ends are extended in the fabrication process across the cut region CT1 of the substrate and are short-circuited by a line SHg. This short-circuiting line SHg in the fabrication process is useful for supplying the electric power at the anodizing time and for preventing the electrostatic breakdown at the time of rubbing the orientation film ORI1.

<<Drain Terminal DTM>>

FIG. 11 is a diagram showing the connection from the video signal line DL to its external connection terminal DTM, and (A) presents a top plan view whereas (B) presents a section taken along line B—B of (A). Incidentally, FIG. 10 corresponds to the upper righthand portion of FIG. 7 and has its righthand direction corresponding to the upper end portion (or the lower end portion) of the substrate SUB1, although the direction of the drawing is changed for conveniences.

Letters TSTd designate a test terminal which is not connected with any external terminal but widened to contact with a probe or the like. Likewise, the drain terminal DTM is also made wider than the wiring portion as to connected with the external terminal. The test terminal TSTd and the external connection drain terminal DTM are so alternately arrayed in plurality as to be vertically staggered so that the test terminal TSTd terminates without reaching the end portion of the substrate SUB1, as shown. But, the drain terminals DTM constitute the terminal group Td (whose suffix is omitted), as shown in FIG. 7, and are further extended across the cut line CT1 of the substrate SUB1 so that all of them are short-circuited to each other through lines SHd so as to prevent any electrostatic breakdown during the fabrication step. The drain connection terminals are connected to the opposite sides of the video signal lines DL, in which the test terminal TSTd are present, across the matrix, whereas the test terminals are connected to the opposite sides of the video signal lines DL, in which the drain connection terminals DTM are present, across the matrix.

By a reason similar to the gate terminal GTM, the drain connection terminal DTM is formed of two layers, i.e., the Cr layer g1 and the ITO layer d1 and is connected with the video signal line DL through the portion, from which is removed the gate insulating film GI. The semiconductor layer AS formed over the end portion of the gate insulating film GI is provided for etching the edge of the gate insulating film GI in a taper shape. For connection with an external circuit, the passivation film PSV1 is naturally removed from the terminal DTM. Letters AO designate the aforementioned anodizing mask which has its boundary formed to enclose the entirety of the matrix. As shown, the Lefthand side is covered with the mask, but the remaining uncovered portion has no layer g2 so that it has no relation to the pattern.

The leading lines from the matrix portion to the drain terminal portion DTM are constructed, as shown at (C) in FIG. 8, such that the layers d1 and g1 at the same level as the video signal lines DL are laminated midway of the seal pattern SL just over the layers d1 and g1 at the same level as the drain terminal portion DTM. This construction is intended to minimize the probability of breakage of lines thereby to protect the galvanically corrosive Al layer as much as possible with the passivation film PSV1 and the seal pattern SL.

<<Equivalent Circuit of Whole Display Circuit>>

Figure 12:
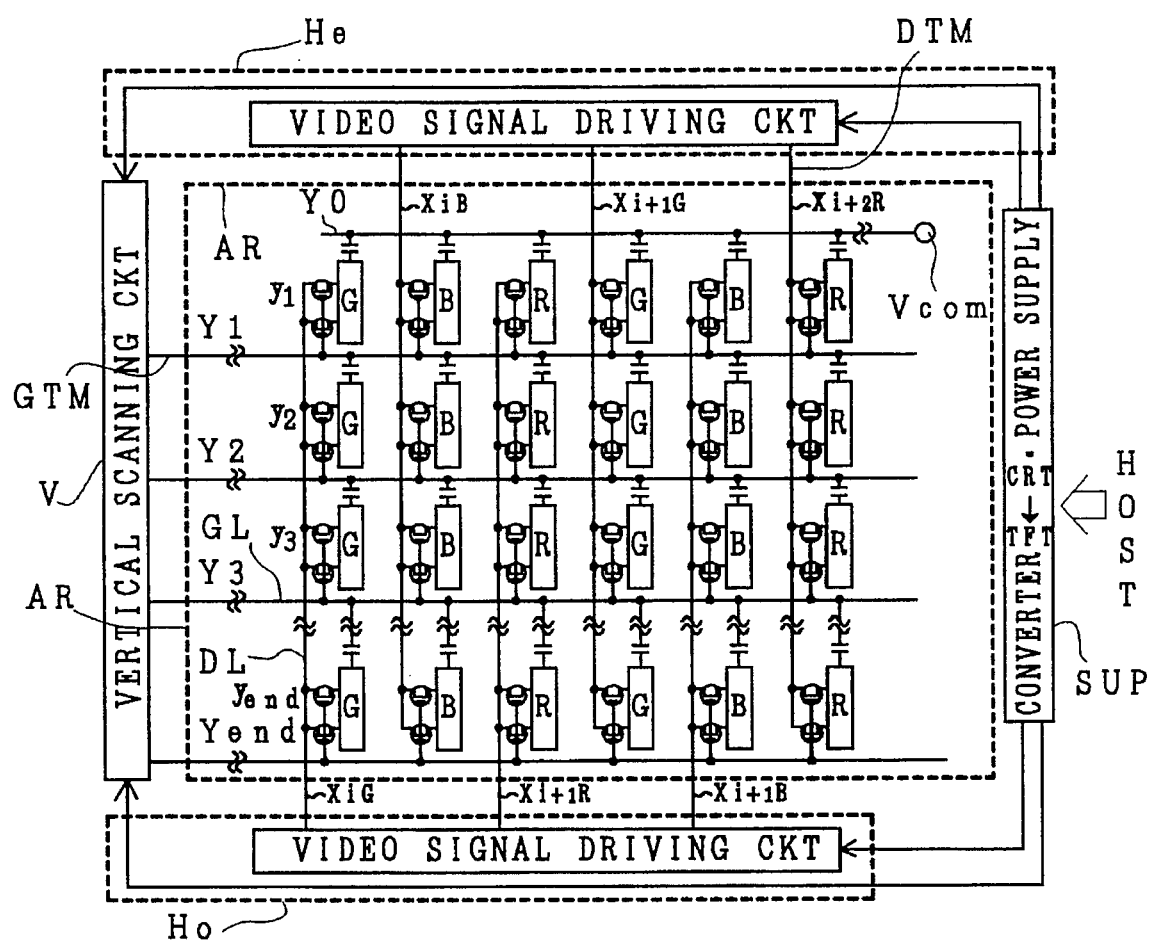
FIG. 12 is an equivalent circuit diagram showing a liquid crystal display circuit of a color liquid crystal display device of active matrix type.

FIG. 12 shows an equivalent circuit diagram of the display matrix portion and a wiring diagram of its peripheral circuits. Although this drawing is a circuit diagram, it is depicted in a manner to correspond to a practical geometric disposition. Letters AR designate a matrix array formed by disposing a plurality of pixels two-dimensionally.

In the drawing, letter X designates the video signal line, and suffixes G, B and R are added to correspond to green blue and red pixels, respectively. Letter Y designates the scanning signal line GL, and suffixes 1, 2, 3, ———, end so on are added in accordance with the sequence of the scanning timing.

The video signal line X (whose suffix is omitted) is alternately connected with the upper (or odd-numbered) video signal driving circuit He and with the lower (or even-numbered) video signal driving circuit Ho.

The scanning signal line Y (whose suffix is omitted) is connected with a vertical scanning circuit V.

Letters SUP designate a circuit which includes a power, supply circuit for obtaining a plurality of divided and stabilized voltage sources from one voltage source, and a circuit for converting data for CRT (i.e., Cathode Ray tube) from a host (i.e., a higher-order operational processor) to data for the TFT liquid crystal display device.

<<Working of Latching Capacitor Cadd>>

The latching capacity element Cadd functions to reduce the influences of the gate potential variation delta Vg upon the center potential (e.g., the pixel electrode potential) V1c when the thin film transistor TFT switches, as expressed by the following formula:

$$\Delta V1c = \{C_{gs}/(C_{gs}+C_{add}+C_{pix})\} \times \Delta Vg,$$

where Cgs represents a parasitic capacitance formed between the gate electrode GT and source electrode SD1 of the thin-film transistor TFT; Cpix represents a capacitance formed between the transparent pixel electrode ITO1(PIX) and the common transparent pixel electrode ITO2(COM); and ΔV1c represents the amount of change in the pixel electrode potential caused by ΔVg. This variation delta V1c causes the DC component to be added to the liquid crystal LC and can he reduced the more for the higher latching capacitor Cadd. Moreover, the latching capacitor Cadd functions to elongate the discharge time and stores the video information for a long time after the thin film transistor TFT is turned off. The DC component to be applied to the liquid crystal LC can improve the lifetime of the liquid crystal LC, to reduce the so-called "printing", by which the preceding image is left at the time of switching the liquid crystal display frame.

Since the gate electrode GT is enlarged to such an extent as to cover the semiconductor layer AS completely, as has been described hereinbefore, the overlapped area with the source electrode SD1 and the drain electrode SD2 is increased to cause an adverse effect that the parasitic capacity Cgs is increased to make the center potential V1c liable to be influenced by the gate (scanning) signal Vg. However, this demerit can be eliminated by providing the latching capacitor Cadd.

The latching capacity of the latching capacitor Cadd is set from the pixel writing characteristics to a level four to eight times as large as that of the liquid crystal capacity Cpix (4 * Cpix<Cadd<8 * Cpix) and eight to thirty two times as large as that of the capacity Cgs (8 * Cgs<Cadd<32 * Cgs).

The initial stage scanning signal Line GL (i.e., $Y_0$) to be used only as the capacity electrode line is set to the same potential as that of the common transparent pixel electrode (Vcom) ITO2. In the example of FIG. 7, the initial stage scanning signal line is short-circuited to the common electrode COM through the terminal GTO, the leading line INT, a terminal DTO and an external line. Alternatively, the initial stage latching capacity electrode line $Y_0$ may be connected with the final stage scanning signal line Yend or a DC potential point (or AC ground point) other than the Vcom, or connected to receive one excess scanning pulse $Y_0$ from the vertical scanning circuit V.

<<Method of Manufacture>>

Next, by referring to FIGS. 13 through 15, the steps of manufacturing the substrate SUB1 side of the above-mentioned liquid crystal display device will be described. In these figures, the central letters indicate the abbreviations of the step names, with the left-hand side representing the pixel portions in FIG. 3 and the right-hand side representing the process flow, as viewed in section in the vicinity of the gate terminals shown in FIG. 10. Incidentally, the patterning process is herein termed a series of steps from the application of the photoresist, through the selective exposure using the mask to the development, and its repeated description will be omitted. The following description will be made according to the divided steps.

Figure 13A:
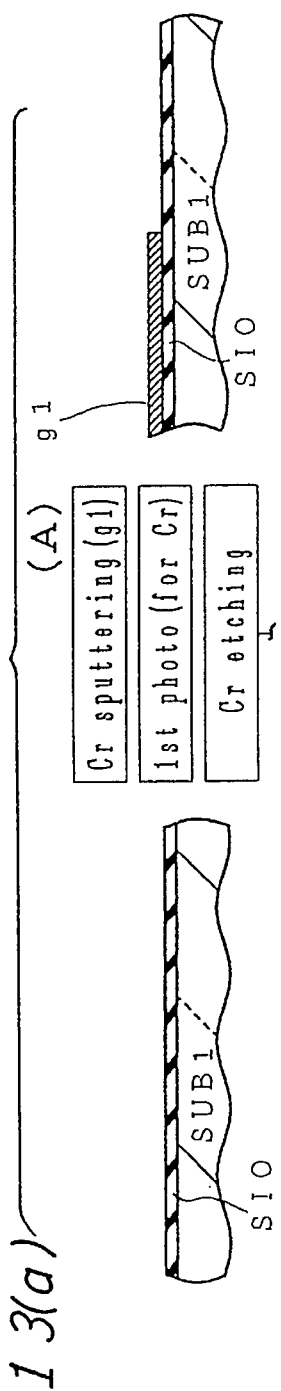
FIGS. 13(a)–13(c) present a flow chart of sections of a pixel portion and a gate terminal portion and shows the fabrication steps A to C' at the side of a substrate SUB1.

Step A, FIG. 13(a)

The lower transparent glass substrate SUB1 made of 7059 glass (product name) is deposited with a silicon oxide film SIO on both sides by dip treatment and is baked at 500° C. for 60 minutes. A first conductive film g1 of chromium having a thickness of 1100Å is formed over the lower transparent glass substrate SUB1 by the sputtering. After the photographic treatment, the first conductive film g1 is selectively etched with an etching solution of ammonium cerium nitrate. This process forms gate terminals GTM, drain terminals DTM, anodic oxidized bus lines SHg connecting the gate terminals GTM, bus lines SHd short-circuiting the drain terminals DTM, and anodic oxidized pads (not shown) connected to the anodic oxidized bus lines SHg.

Figure 13B:
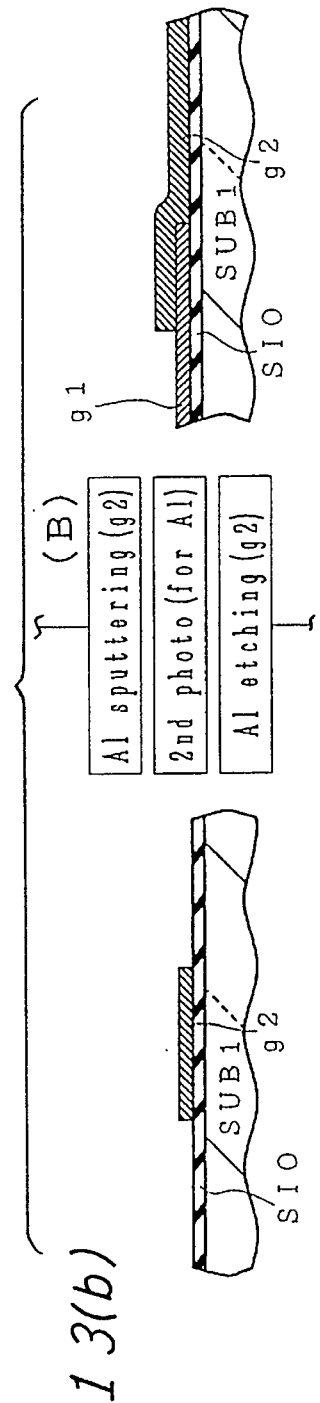

Step B, FIG. 13(b)

A second conductive film g2 having a thickness of 2,800 angstroms and made of Al—Pd, Al—Si, Al—Si—Ti or Al—Si—Cu is formed by the sputtering. After the photolithographic treatment, the second conductive film g2 is selectively etched with a mixed acid solution of phosphoric acid, nitric acid and glacial acetic acid.

Figure 13C:
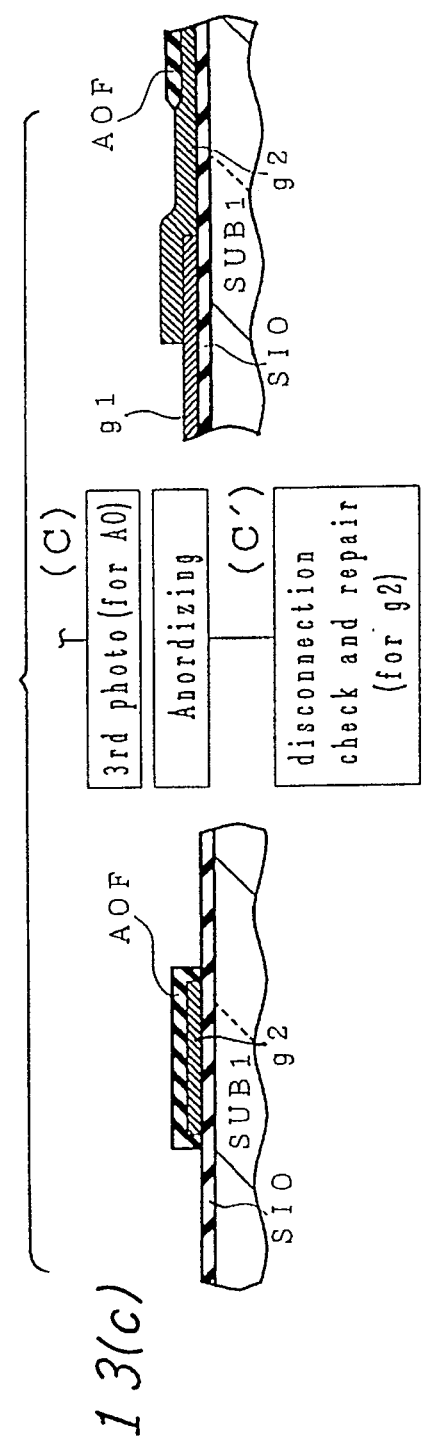

Step C, FIG. 13(c)

After the photolithographic treatment (i.e., after the formation of the aforementioned anodized mask AO), the substrate SuB1 is dipped in the anodizing liquid which is prepared by diluting a solution containing 3% of tartaric acid adjusted to PH 6.2 to 6.3 with a solution of ethylene glycol, and the anodizing current density is adjusted to 0.5 mA/cm$^2$ (for anodization at a constant current). Next, an anodization is carried out till an anodization current of 125 V necessary for a predetermined $Al_2O_3$ film thickness is reached. After this, the substrate SUB1 is desirably held in this state for several ten minutes (for anodization at a constant voltage). This is important for achieving a uniform $Al_2O_3$ film. Thus, the conductive film g2 is anodized to form an anodized film AOF having a thickness of 1,800 angstroms over the scanning signal line GL, the gate electrode GT and the electrode PL1.

Step C', FIG. 13(c)

It is checked whether or not the scanning signal line GL formed of the second conductive film g2 thus formed is normally connected to have a disconnection.

This check is carried out by bringing a probe into abutment against the gate terminals electrically connected with the two ends of each scanning signal line GL and by measuring the electric resistance of the scanning signal line GL.

The repair for the case, in which the scanning signal line GL is found partially disconnected, will be described with reference to (a) to (c) of FIG. 1.

Figure 1B:
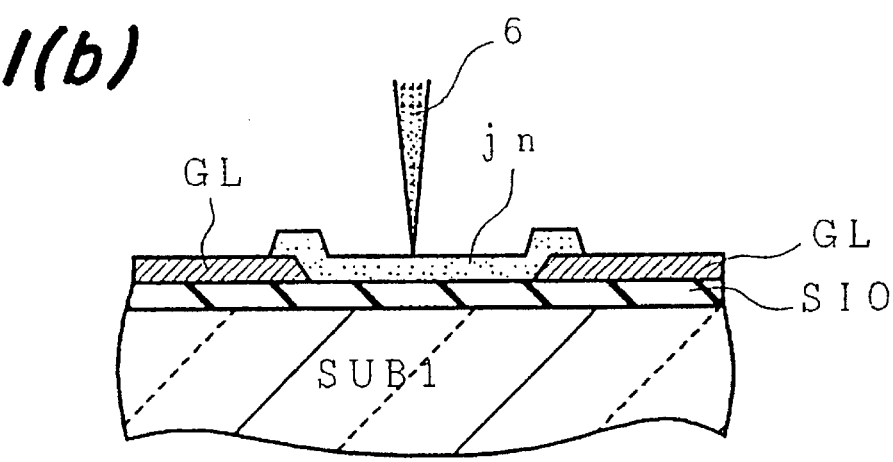
Figure 1C:
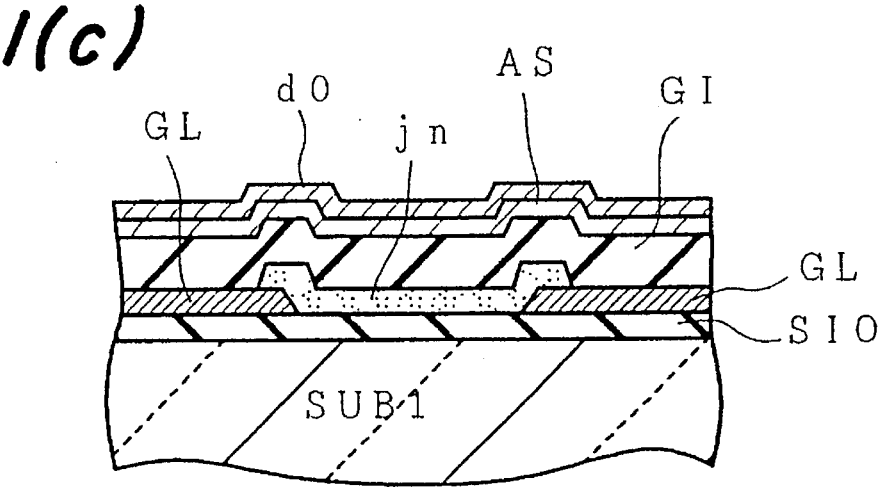

FIGS. 1(a) to 1(c) present sections, for example, as taken along line 2—2 of FIG. 2. These sections are visually shown to provide their positional information by any means. For example, the lower glass substrate SUB is placed on the X-Y stage arranged to confront a microscope, and the X-Y stage when the disconnected portion is found through the microscope is positioned to correspond to the aforementioned positional information. This positional information is used at the repairing time to be carried out later.

The disconnected portion of the scanning signal line GL, as shown in FIG. 1(a), is irradiated with the laser beam in a specific atmosphere, as shown in FIG. 1(b), to form a platinum (Pt) layer to repair the disconnection by its junction layer jn.

Figure 21:
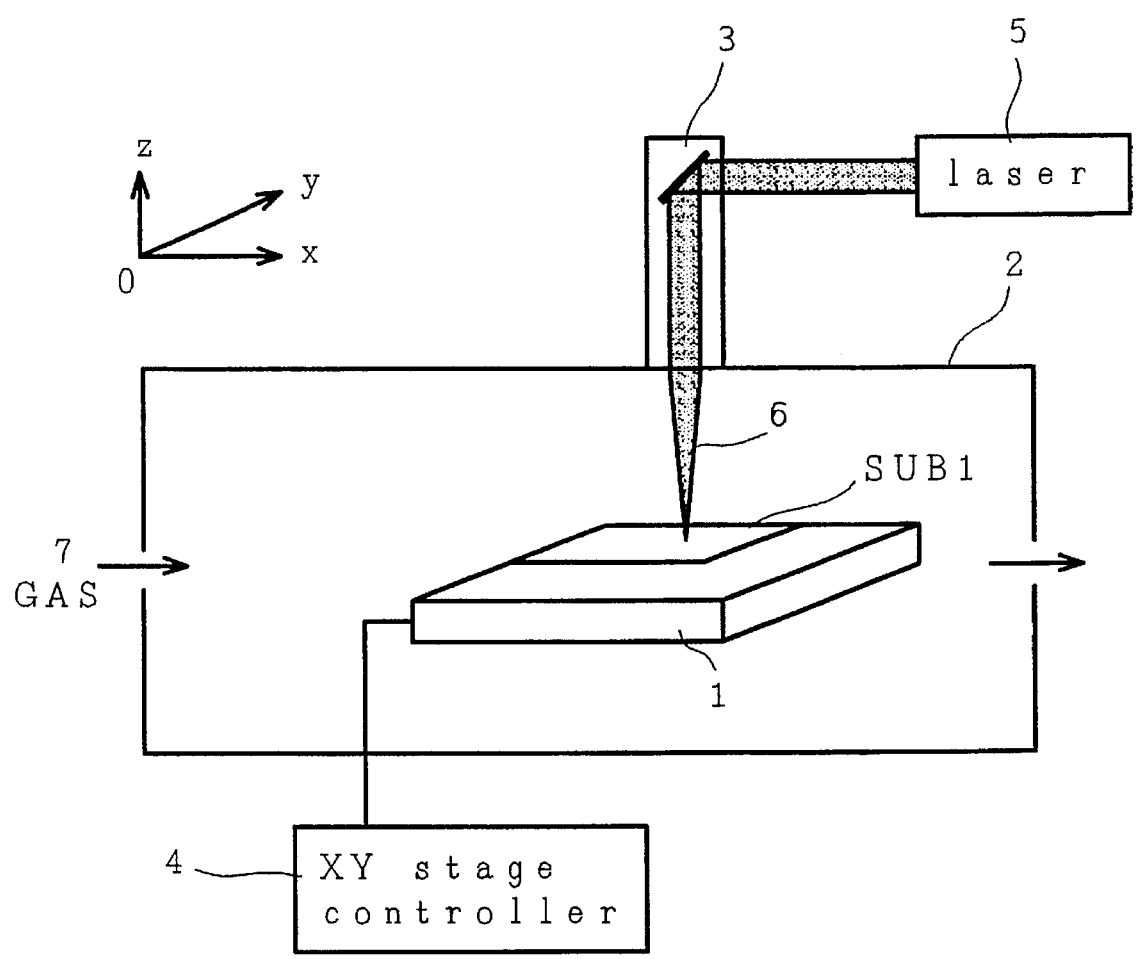
FIG. 21 is a diagram showing a construction of one embodiment of an optical CVD apparatus to be used in the present invention.

FIG. 21 is a schematic diagram showing a construction of one embodiment of an apparatus for repairing that disconnection.

In FIG. 21, there is disposed a bell jar 2 which has an X-Y stage 1 mounted therein. To this bell jar 2, there is attached a lens mount for the microscope and the laser, which is arranged to confront said X-Y stage 1. This X-Y stage 1 is arranged with the lower glass substrate SUB1 to have its disconnection checked.

By driving the X-Y stage 1, the lower glass substrate SUB1 can have its working surface opposed all its area to the microscope/laser lens mount 3. The X-Y stage 1 has its drive controlled by an XY stage controller so that the disconnected portion can confront the microscope/laser lens mount 3 in response to the input of the aforementioned positional information. Incidentally, whether or not the confronting is ensured can be checked by using the microscope of the microscope/laser lens mount 3.

This microscope/laser lens mount 3 can have the laser beam guided from a laser beam 5 to illuminate the disconnected portion of the scanning signal line GL. This laser beam may be exemplified by an Ar laser or a YAG laser. The laser beam has a wavelength of 0.55 μm for the Ar laser and a wavelength of 1.05 μm (and a second higher harmonic wave of 0.53 μm). Both of these beams may suitably have a power of about 200 mW and a beam diameter of 5 to 10 μm.

The bell jar 2 is supplied as a material gas 7 with a mixture of $(PtCl_2)_2(CO)_3$ gas and Ar gas.

As a result, the portion irradiated with a laser beam 6 chemically reacts to form a platinum (Pt) layer, which is used as the junction layer jn to connect the disconnected scanning signal line GL.

Figure 25A:
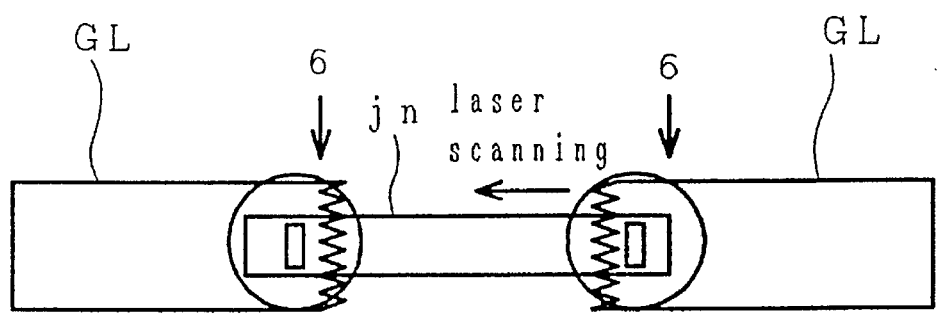
FIGS. 25(a)–25(b) are diagrams for explaining a method of scanning a laser beam 6 according to the present invention.

Incidentally, at a pre-treatment for forming the Pt layer, the so-called "annealing" is preferably accomplished with the laser beam 6 to clean the region to be formed with the Pt layer. At the time of forming the Pt layer, it has been confirmed that the Pt junction layer jn is well formed by scanning the laser beam 6 from one to other sides of the scanning signal lines across the disconnected region, as shown in FIG. 25(a).

Although the foregoing description has been made to repair with the Pt layer, the present invention should not be limited thereto but may use Cr, Mo, W or the like, for example. In this modification, the material gas 7 is exemplified, respectively, by $Cr(CO)_6+H_2$, $MoCl5+H_2$ or $Mo(CO)_6+Ar$, and $WCl_6+H_2$ or $WF_6+H_2$.

Moreover, similar effects can be attained even if not the laser beam 7 but the focused ion beam method is used to draw the In or the like directly.

Figure 14A:
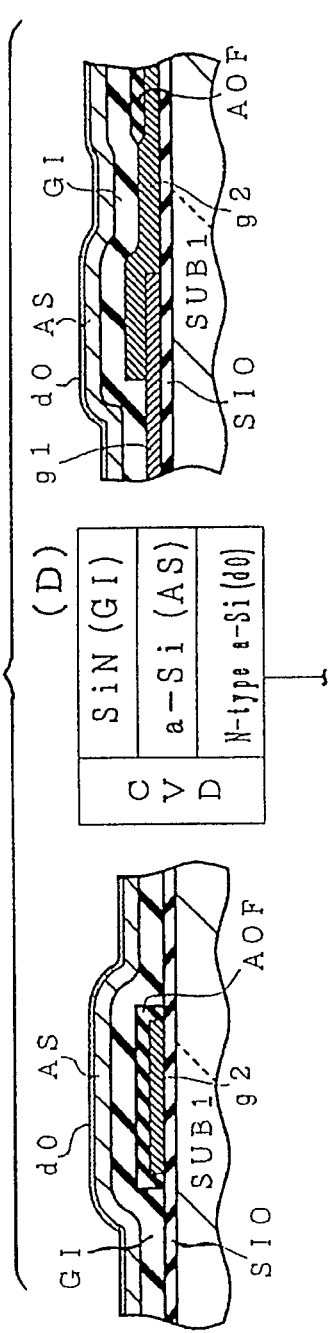
FIGS. 14(a)–14(c) present a flow chart of sections of the pixel portion and the gate terminal portion and shows the fabrication steps D to F at the side of the substrate SUB1.
Figure 14B:
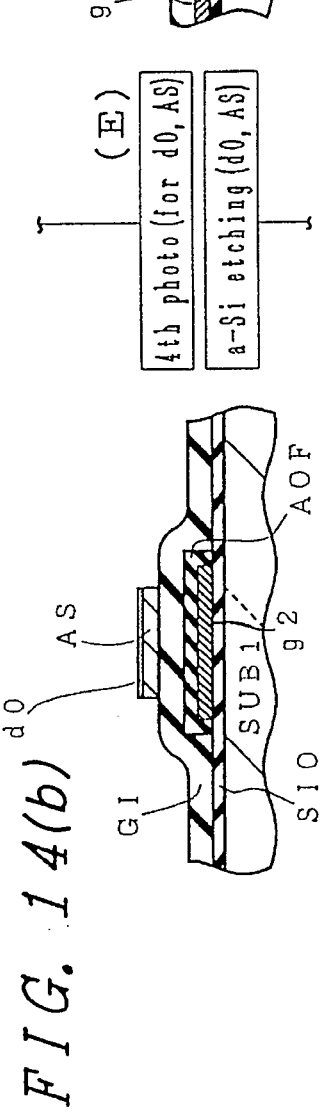

Step D, FIG. 14(a)

Ammonia gas, silane gas and nitrogen gas are introduced into a plasma CVD apparatus to form a Si nitride film having a thickness of 2,000 angstroms, and silane gas and hydrogen gas are introduced into the plasma CVD apparatus to form an i-type amorphous Si film having a thickness of 2,000 angstroms. After this, hydrogen gas and phosphine gas are introduced into the plasma CVD apparatus to form an N(+)-type amorphous Si film having a thickness of 300 angstroms.

Here, the disconnected portion of the scanning signal line GL is formed, as shown in FIG. 1(c).

Figure 14C:
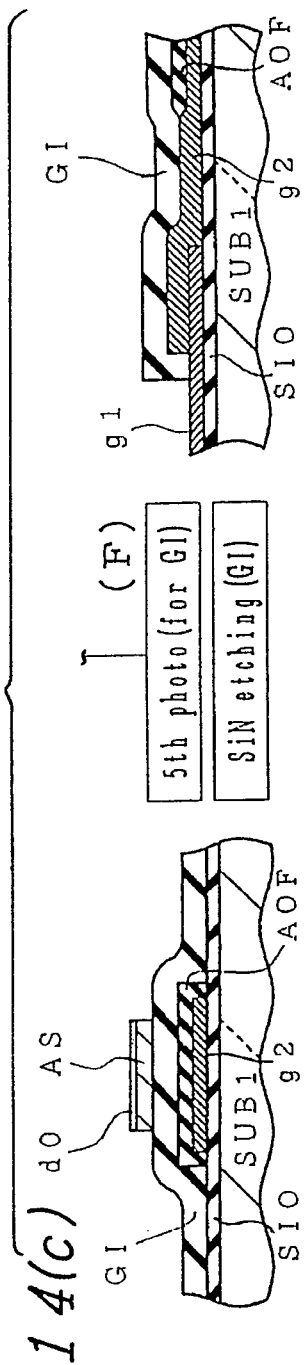

Step E, FIG. 14(c)

After the photographic treatment, dry etching gases $SF_6$ and $CCl_4$ are used to etch the N(+) type amorphous Si film and the i-type amorphous Si film selectively to form an island of the i-type semiconductor layer AS.

Step F, FIG. 14(c)

After the photolithography, the Si nitride film is selectively etched by using $SF_6$ as the dry etching gas.

Figures 15A, 15B, 15C:
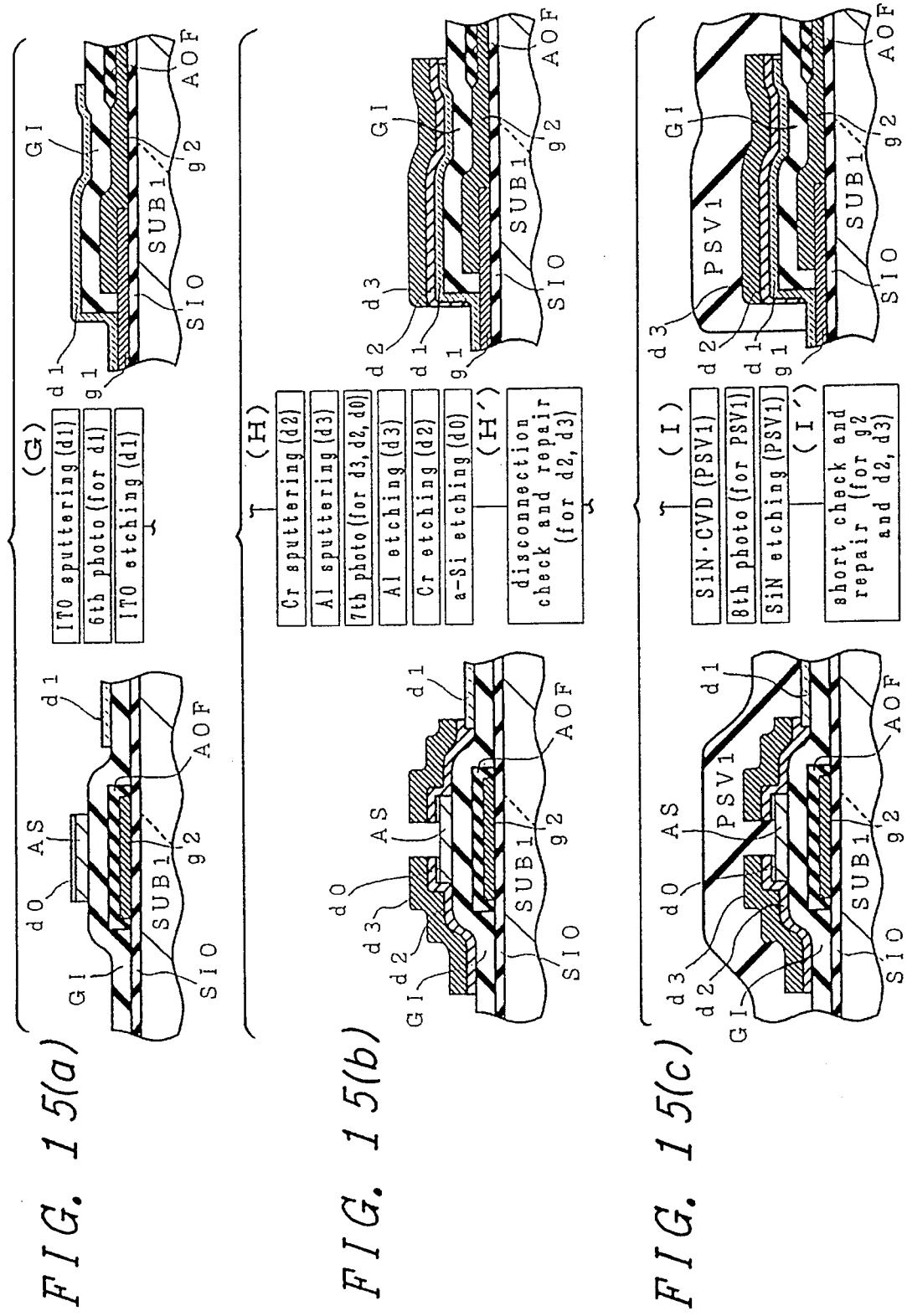
FIGS. 15(a)–15(c) present a flow chart of sections of the pixel portion and the gate terminal portion and shows the fabrication steps G to I' at the side of the substrate SUB1.

Step G, FIG. 15(a)

A first conductive film d1 formed of an ITO film having a thickness of 1,400 angstroms is formed by the sputtering. After the photographic treatment, the first conductive film d1 is selectively etched with an etching liquid of the mixed acid solution of hydrochloric acid and nitric acid to form the uppermost layer of the gate terminal GTM and the drain terminal DTM and the transparent pixel electrode ITO1.

Step H, FIG. 15(b)

A second conductive film d2 of Cr having a thickness of 600 angstroms is formed by the sputtering, and a third conductive film d3 of Al—Pd, Al—Si, Al—Si—Ti or Al—Si—Cu having a thickness of 4,000 angstroms is formed by the sputtering. After the photographic treatment, the third conductive film d3 is etched with a liquid similar to that of Step B, and the second conductive film d2 is etched with a liquid similar to that of Step A to form the video signal line DL, the source electrode SD1 and the drain electrode SD2. Next, the dry etching apparatus supplied with $CCl_4$ and $SF_6$ to etch the N(+) type amorphous Si film to selectively remove the N(+) type semiconductor layer d0 between the source and the drain.

Step H', FIG. 15(c)

It is checked whether or not the video signal line DL made of a laminate of the second conductive film d2 and the third conductive film d3 thus formed is normally connected to have a disconnection.

The check of this case is carried out by the method similar to that described in connection with the Step C', by bringing the probe into abutment against the drain terminal portion electrically connected with the two ends of the video signal line DL.

Figure 22A:
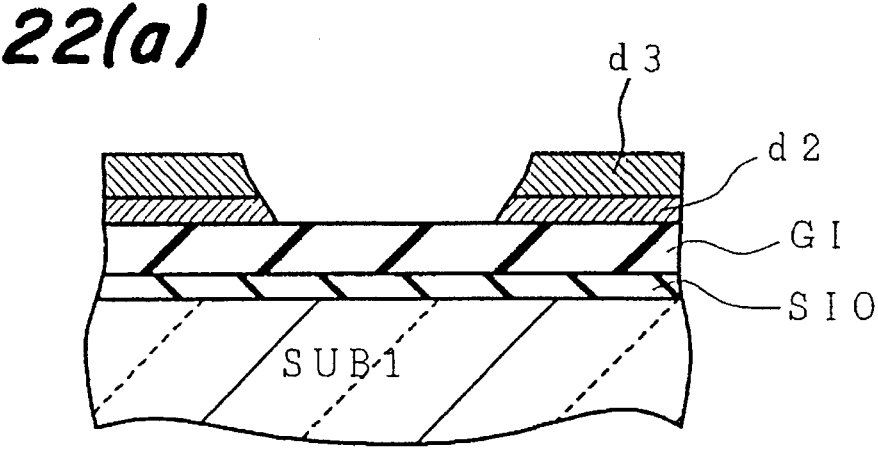
FIGS. 22(a)–22(c) are process diagrams showing another embodiment of the present invention.
Figure 22B:
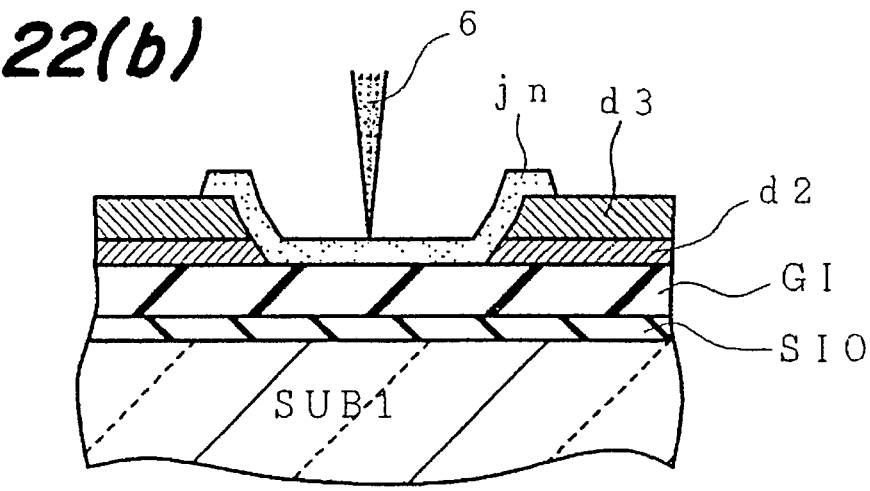
Figure 22C:
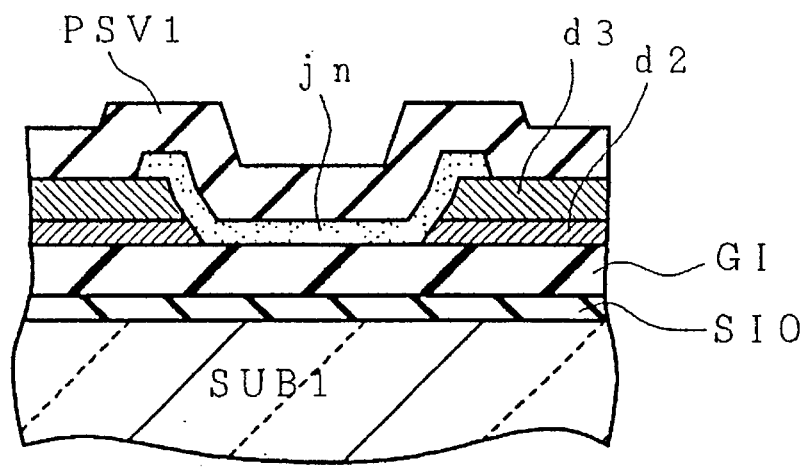

The repair of the case, in which the video signal line DL is partially disconnected, is shown in FIGS. 22(a) to 22(c).

FIGS. 22(a) to 22(c) present sections taken along line 22—22 of FIG. 2, for example. The repair of the disconnection shown in FIG. 22(b) is carried out as at Step C'.

Step I, FIG. 15(c)

The plasma CVD apparatus is supplied with ammonia gas, silane gas and nitrogen gas to form the Si nitride film having a thickness of 1 μm. After the photographic treatment, the Si nitride film is selectively etched by the photo-etching technique using $SF_6$ as the dry etching gas to form the passivation film PSV1.

Here, the disconnected portion of the video signal line DL is formed, as shown in FIG. 22(c).

Step I', FIG. 15(c)

It is checked whether or not the scanning signal line GL and the video signal line DL having already been formed are short-circuited at their intersection.

Figure 23:
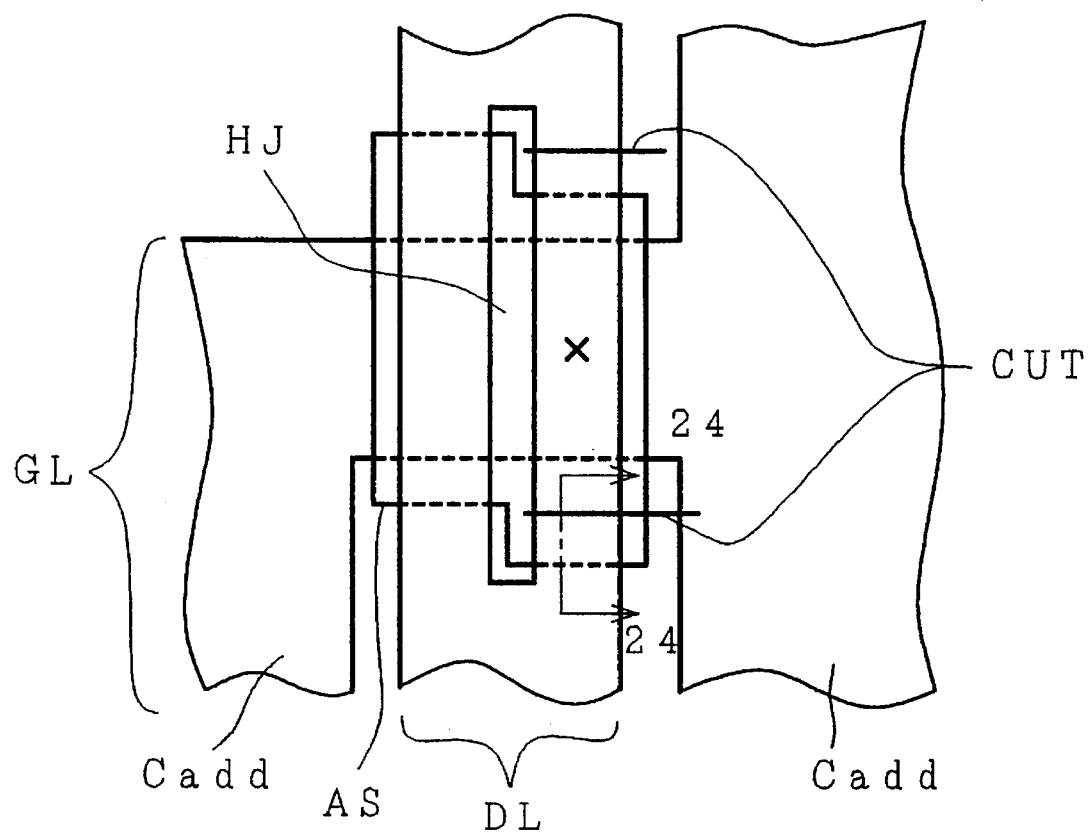
FIG. 23 is an explanatory diagram showing a construction for repairing the short-circuiting between a scanning signal line and a video signal line.

Here, FIG. 23 shows the construction which can be repaired by partially disconnecting the video signal line DL in case the scanning signal line GL and the video signal line DL are shorted. FIG. 23 presents a top plan view showing the intersection between the scanning signal line GL and the video signal line DL, and FIG. 2 shows that portion in more detail in an enlarged scale.

The video signal line DL is formed, at its central intersection with the scanning signal line GL, with a through hole HJ extending in the longitudinal direction.

If the inter-layer insulating film is shorted at a portion X by a pin hole, the video signal line DL including that portion is isolated together with the aforementioned through hole HJ from the other portion of the video signal line DL by the cut portion, as indicated at CUT. As a result, the other portion of the video signal line DL can be used to achieve the repair.

Figure 24A:
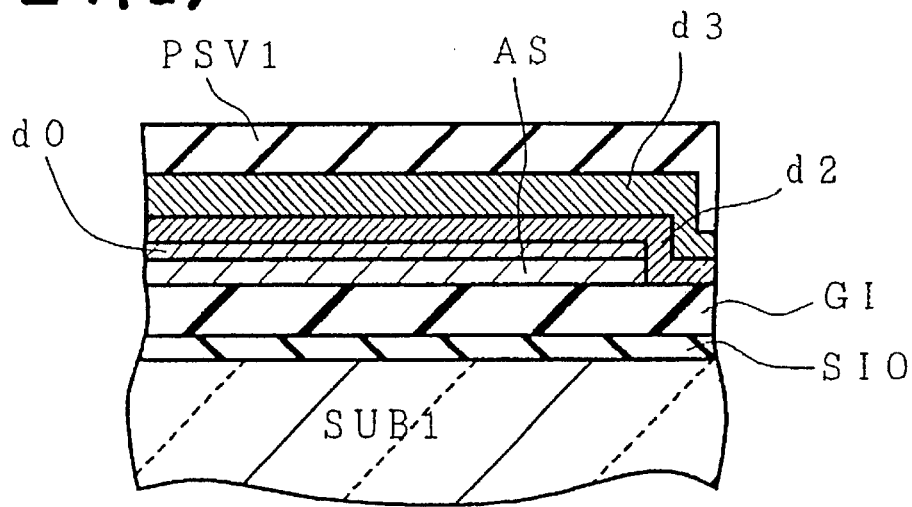
FIGS. 24(a)–24(c) are process diagrams showing another embodiment of the present invention.
Figure 24B:
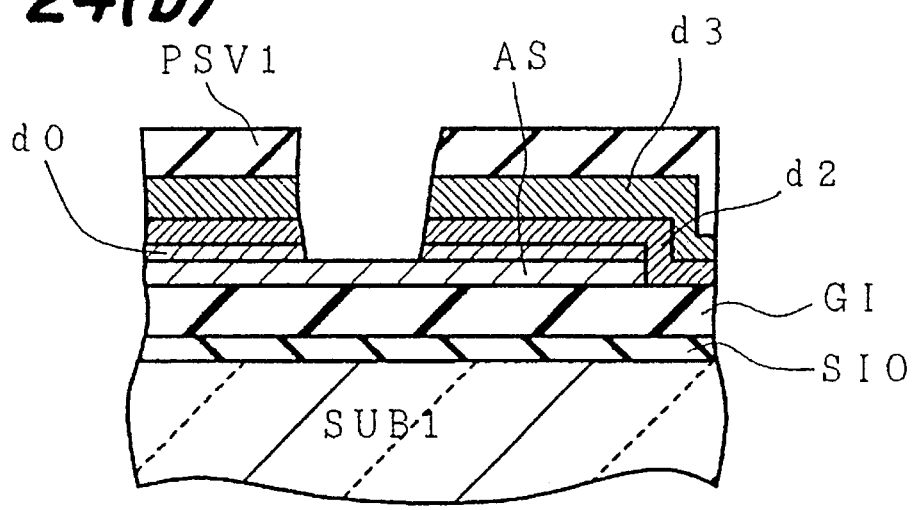
Figure 24C:
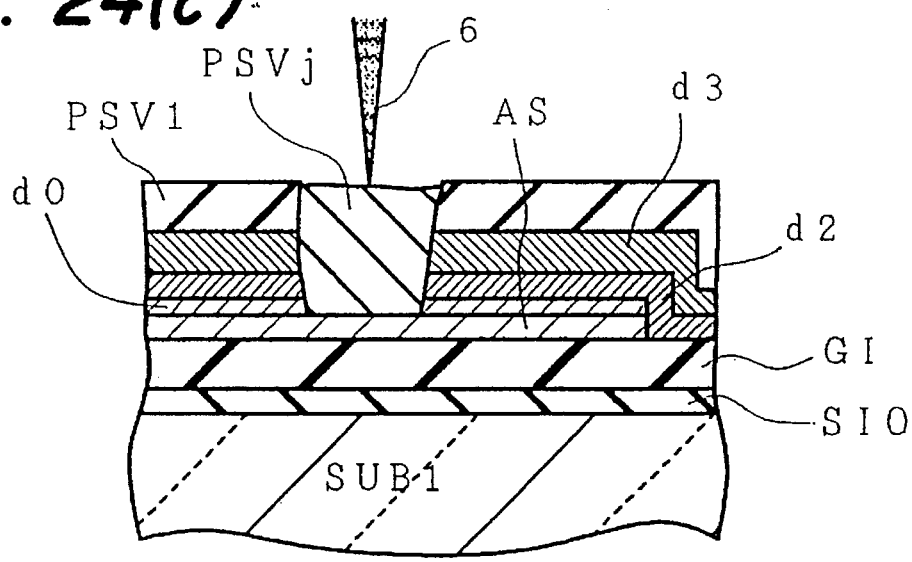

FIGS. 24(a) to 24(c) are diagrams showing those steps. First of all, FIG. 24(a) is a section taken along lien 24—24 of FIG. 23. The portion CUT of FIG. 23 is irradiated with the laser beam, for example, and cut by removing the passivation film PSV1, the third conductive film d3, the second conductive film d2 and the N(+) type semiconductor layer d0, as shown in FIG. 24(b).

After this, the cut portion is formed with the passivation film PSVj by using the laser beam 6 as at Step C'. In this case, the material gas 7 shown in FIG. 21 is exemplified by $SiH_4+NH_5+N_2$.

In the manufacture process thus far described, the repair of the disconnection of the scanning signal line GL and the video signal line DL is carried out after its formation and before it is covered with the passivation film PSV or the like. However, this repair should not be limited thereto but may naturally be carried out after the film has been covered with the passivation film PSV.

In this case, the passivation film PSV can be removed by the laser beam to expose the disconnected portion to the outside. After this, the junction layer jn can be formed as at Step C' or Step H', and the passivation film PSVj can be formed as at Step I'. The order of forming the junction film jn and the passivation film PSVj can be used in the apparatus shown in FIG. 21, and the material gas 7 to be fed to the bell jar 2 may be replaced.

Moreover, the present invention should not be limited to the embodiment thus far described, but can be improved in various manners to repair the disconnected lines more simply and reliably.

For example, the method of scanning the laser beam 6 shown in FIG. 25 forms the junction layer jn on a foreign substance, if present on the disconnected portion, as shown in FIG. 25(a), to cause a problem in the reliability.

Figure 25B:
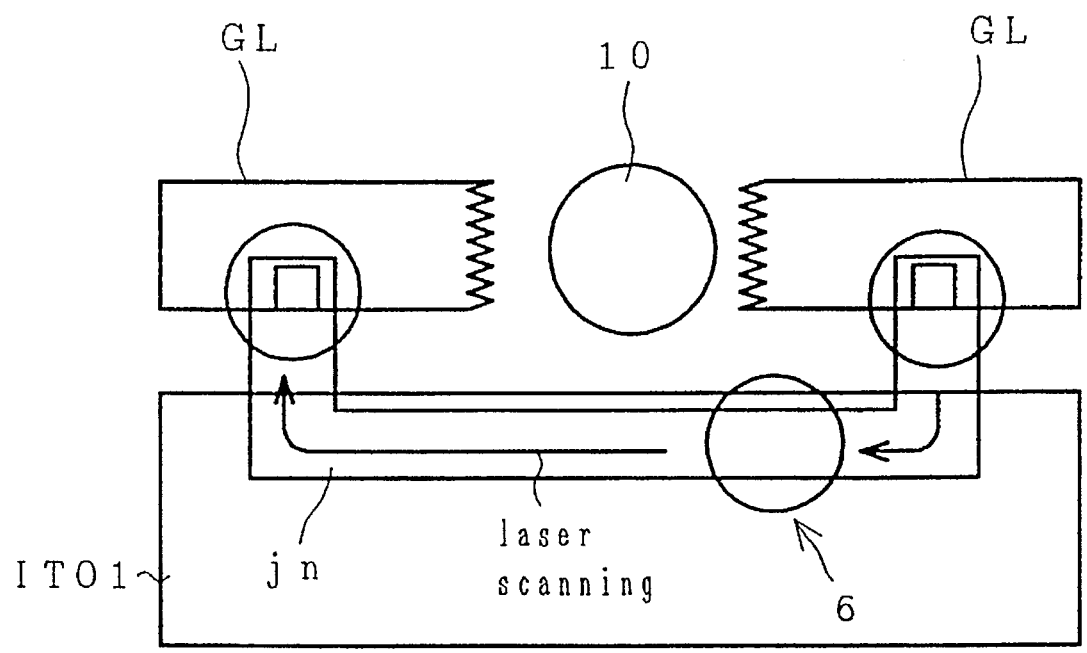

In case a foreign substance is present on the disconnected portion, therefore, the disconnection can be reliably repaired by scanning while avoiding the foreign substance, as shown in FIG. 25(b).

Incidentally, in case the disconnection repairing method is performed at the pixel portion, as shown in FIG. 25(b), the junction layer jn may cover or contact with the adjoining pixel electrode ITO1, to cause a problem in a point defect. Since, however, this point defect is less apparent from the line defect, the embodiment of FIG. 25(b) is very effective as a method of repairing the disconnection simply and reliably.

Figure 26A:
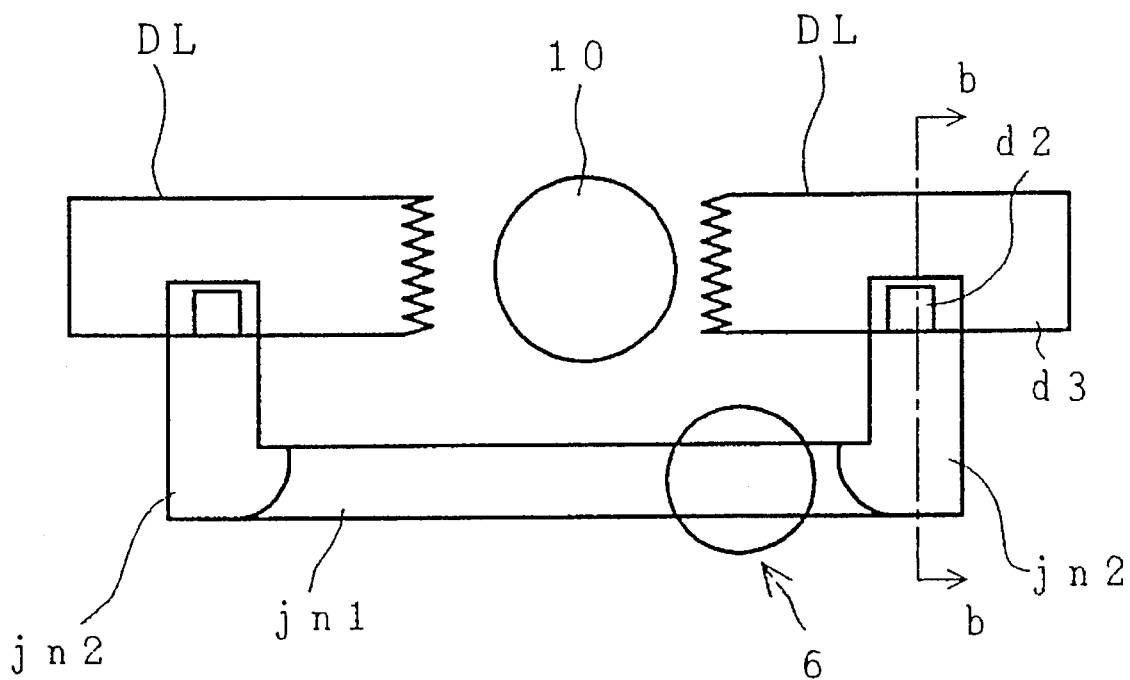
FIGS. 26(a)–26(b) are diagrams showing another embodiment of the method of scanning the laser beam 6 according to the present invention.

Moreover, the junction layer jn may be formed by scanning the laser beam 6 several times. FIG. 26 shows one example of forming the junction layer by scanning the laser beam 6 several times. In the embodiment of FIG. 26, the first junction layer jn1 is formed by the first scanning, and the second junction layer jn2 is formed by the second scanning on the portion at which the first junction layer jn1 crosses the wiring line (i.e., the video signal line DL in this embodiment). According to the embodiment of FIG. 26, therefore, the disconnection of the junction line jn is prevented to enhance the reliability by thickening the junction layer jn of the stepped portion which is formed by the video signal line DL, as shown in FIG. 26(b).

Figure 26B:
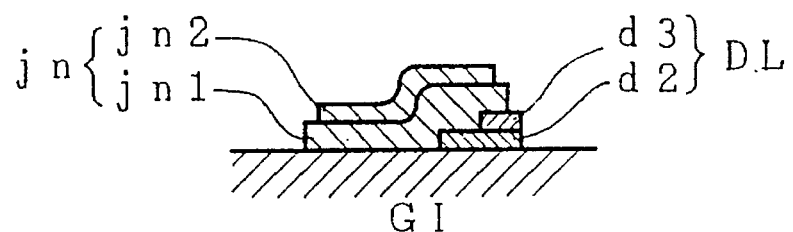

In the embodiment shown in FIG. 26(b), moreover, in order to ensure the connection between the junction layer jn and the video signal line DL better, the conductive film d3 is partially notched to expose the conductive film d2 to the outside and to connect the conductive film d2 and the junction layer jn.

In the present embodiment, the conductive film d3 is made of Al, and it has been experimentally found that the connection between the material Al and the Pt used to make the junction layer jn is not good.

In the present embodiment, therefore, the conductive layer d2 is exposed from the conductive film d3 and is connected with the junction layer jn.

In the present embodiment, the conductive film d2 is made of Cr, and the connection between Cr and Pt is excellent so that the connection between the video signal line DL and the junction layer jn can be better ensured to improve the reliability of the liquid crystal display device having its disconnection repaired.

In the present embodiment, the method of removing the conductive film d3 from the conductive film d2 is exemplified by the method of removing the conductive film d3 by the laser beam irradiation.

Thanks to the use of the laser beam irradiation for the method of removing the conductive film d3, the step of removing the conductive film d3 and the step of forming the junction layer jn can be accomplished in the same bell jar or vacuum to make a contribution to the size reduction of the manufacture apparatus.

Figure 27A:
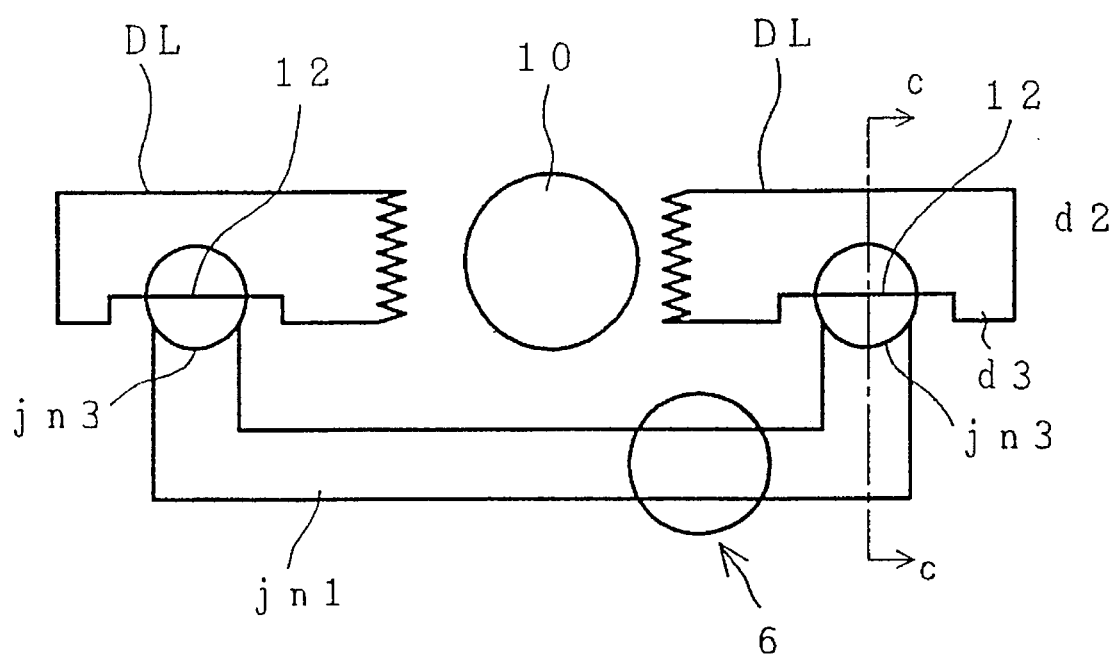
FIGS. 27(a)–27(b) are diagrams for explaining another embodiment of the present invention.
Figure 27B:
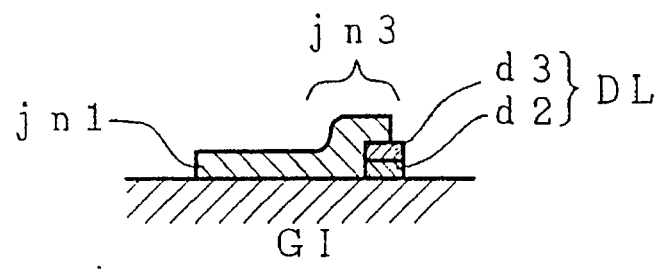

On the other hand, the method of connecting the junction layer jn and the conductive film d2 should not be limited to that of the embodiment of FIG. 26 but may be effected by the method, in which both the conductive films d2 and d3 are notched as at 12, as shown in FIG. 27(a), and are connected with the junction layer jn on the side face of the conductive film d2, as shown in FIG. 27(b) (presenting the C–C' section of FIG. 27(a)).

The embodiment shown in FIG. 26 is advantageous in the large connecting area of the conductive film d2, but has to control the irradiating time and output of the laser beam so as to remove the conductive film d3 on the conductive film d2 only so that it is troubled to require the skills of workers.

On the contrary, in the method of connecting the junction layer in on the side face of the conductive film d2 by forming the notches 12 in both the conductive film d2 and the conductive film d3, as shown in FIG. 27, there is no need for the skills of workers for removing the conductive film d3 only from the conductive film d2, but there arises a problem in that the conductive film d2 has a small connecting area.

This point is considered in the embodiment shown in FIG. 27, the connecting area is enlarged by making the area of the junction layer jn3 on the notch 12 larger than the junction layer jn1 of the other portion, thereby to improve the reliability of the connection between the junction layer junction layer jn and the video signal line DL.

In the embodiment shown in FIG. 27, the method of enlarging the area of the junction layer jn3 is exemplified by making the laser beam irradiating time longer than that for the other junction layer jn1.

According to the method of making the laser beam irradiating time longer than that for the other junction layer jn1 so as to enlarge the area of the junction layer jn3, the growth of the optical CVD film advances, and this method is characterized in that the film thickness is made larger than that of the other junction layer.

Figure 28:
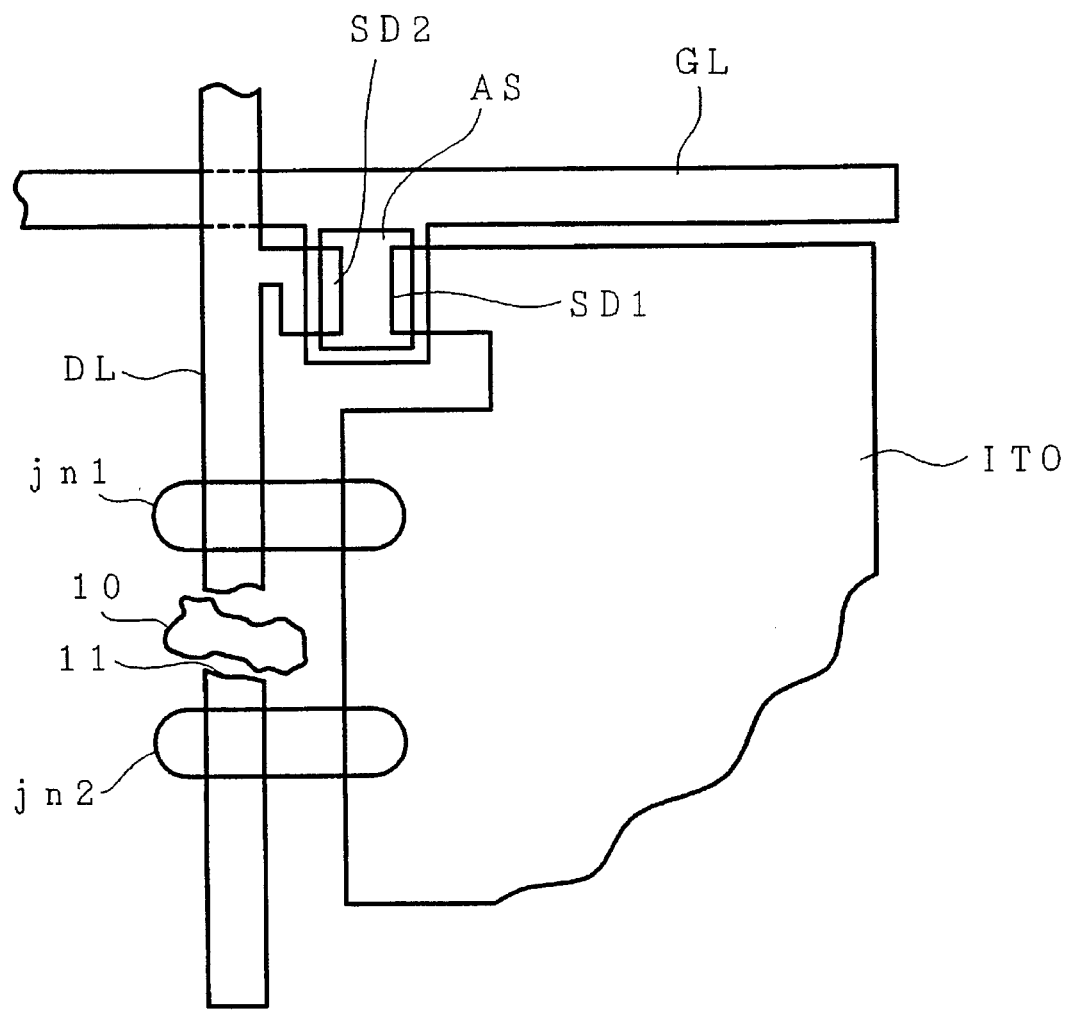
FIG. 28 is a diagram for explaining another embodiment of the present invention.

Moreover, the method of repairing the disconnection in case the foreign substance is present may be exemplified by connecting the disconnected portion through an adjoining pixel electrode, as shown in FIG. 28.

In the main surface of the transparent glass substrate SUB, as shown in FIG. 28, there are arranged a plurality of scanning signal lines GL extending in the direction x. These scanning signal lines GL are arranged in parallel with each other in the direction y.

On the other hand, there are arranged the video signal lines DL extending in the y direction of FIG. 28. These video signal lines DL are arranged in parallel with each other in the direction x of FIG. 28. These video signal lines DL are intersected while being insulated from each other by the (not-shown) inter-layer insulating film which is formed at least between themselves and the scanning signal lines GL.

The square region defined by the scanning signal lines GL and the video signal lines DL is formed with the pixel electrode ITO. This pixel electrode ITO is made of a transparent conductive layer and is partially extended as far as the thin film transistor (TFT) formed over the scanning signal lines GL, to constitute the source electrode SD1.

Said thin film transistor (TFT) is constructed by sequentially forming the gate insulating film, which is formed on the surface of the scanning signal lines GL at the same step as that of the aforementioned inter-layer insulating film, and the semiconductor layer AS made of an a-Si (amorphous silicon). The drain electrode SD2, which is formed to confront the aforementioned source electrode SD1 over said semiconductor layer AS, is formed integrally with the video signal lines DL.

On the other hand, the other portion of the pixel electrode ITO extends to a portion of the adjoining other scanning signal line GL and is superposed thereon through the dielectric film which is formed at the same step as that of the aforementioned inter-layer insulating film, thereby to form the capacitor Cadd at the superposed region.

Incidentally, on the surface of the glass substrate SUB thus constructed, there is formed a (not-shown) passivation film of silicon nitride or the like, which is holed at its central portion leaving the peripheral portion of the pixel electrode ITO.

The liquid crystal display device thus constructed is examined as to whether or not the scanning signal lines GL and the video signal lines DL are disconnected, by feeding them in this state with electricity.

FIG. 28 is a detailed top plan view showing the case in which the video signal lines DL are checked to be disconnected.

On the disconnected portion 11 of the video signal line DL which is an undesired open circuit, there is left on a foreign substance 10 of an impure residual such as the photoresist. This is because the portion having the foreign substance is formed with a step with respect to the peripheral face so that the video signal line DL formed across that portion is disconnected at that stepped portion.

In order to repair this disconnected portion which is an open circuit, in the present embodiment, the end portion of the video signal line DL at one side of the open circuit is connected across that disconnected portion 11 with the adjoining pixel electrode ITO by the junction layer jn1, as shown in FIG. 27, and the end portion of the video signal line DL at the other side of the open circuit is connected with the aforementioned pixel electrode ITO by the junction layer jn2.

In short, said disconnected portion 11 at respective sides of the open circuit is connected through the adjoining pixel electrode ITO.

Here, the junction layers jn1 and jn2 are formed by using the laser CVD method, for example.

According to the method of manufacturing the liquid crystal display substrate thus constructed, the disconnected portion 11 of the video signal line DL is connected and repaired through the adjoining pixel electrode ITO.

By making the connection through the adjoining pixel electrode ITO, more specifically, the junction layers jn1 and jn2 can be formed in the regions other than the disconnected portion 11 of the video signal line DL.

As a result, the junction layers jn1 and jn2 can be formed for the connection and repair in the region having no foreign substance 10, so that the reliability can be drastically improved.

Incidentally, the pixel electrode ITO itself used for the connection and repair has lost its function as that of a pixel element, but a high technical effect can be achieved if it is considered that the disconnection of the video signal line DL cannot be repaired to leave the transparent glass substrate SUB useless.

Although the present embodiment has been described in case the video signal line DL is disconnected, but it can naturally be likewise applied to the case in which the scanning signal line GL is disconnected.

Moreover, the shape of the bell jar 2 for forming the chamber for the reaction of the material gas 7 by the laser beam 6 should not be limited to one covering all over the substrate SUB1, as shown in FIG. 21, but may be another covering a portion of the substrate SUB1, as shown in FIG. 27. According to an embodiment of FIG. 29, only the portion of the substrate SUB1 may be covered with the bell jar (2a, 2b, 2c) to provide features that the disconnection can be easily repaired, that the apparatus can be small-sized, and that the substrate can be easily inserted and extracted more easily than in the structure covering the entirety thereby to improve the production yield.

Figure 29:
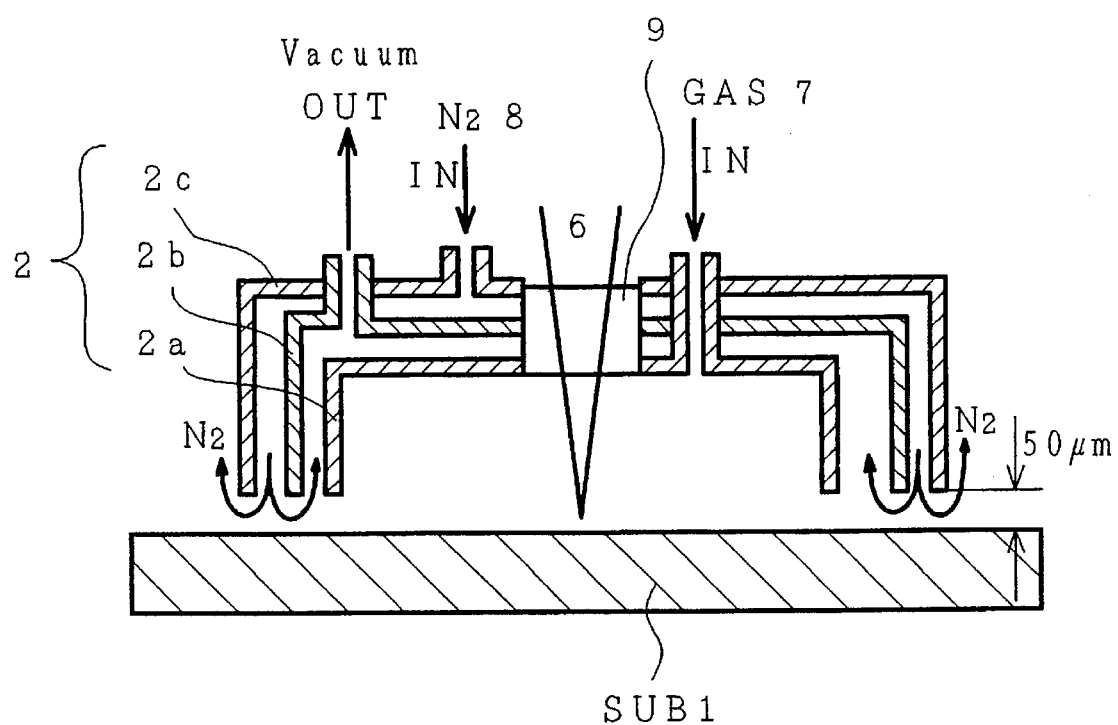
FIG. 29 is a diagram showing another embodiment of the optical CVD apparatus used in the present invention.

Incidentally, the type covering the substrate partially has a problem in the gas-tightness of the bell jar 2 unlike the type covering the substrate entirely. In the embodiment of FIG. 29, therefore, the bell jar 2 is composed of the plurality of bell jars 2a, 2b and 2c to establish a number of chambers inbetween, which are evacuated and fed with an inert gas such as $N_2$ to isolate the chambers from the atmosphere.

In the embodiment of FIG. 29, moreover, the aperture for the laser beam 6 is equipped with a replaceable window. This window may be made of a highly transparent material such as quartz glass 9 in the embodiment of FIG. 29.

In the filming method using the laser beam, generally speaking, the laser beam inlet aperture is also filmed to have a problem that the inlet aperture has its optical transmissivity lowered after a long use. In the embodiment of FIG. 29, the problem of the degradation of the transparency of the quartz glass 9 can be solved by making the quartz glass 9 replaceable.

<<Structure of Whole Liquid Crystal Display module>>

Figure 16:
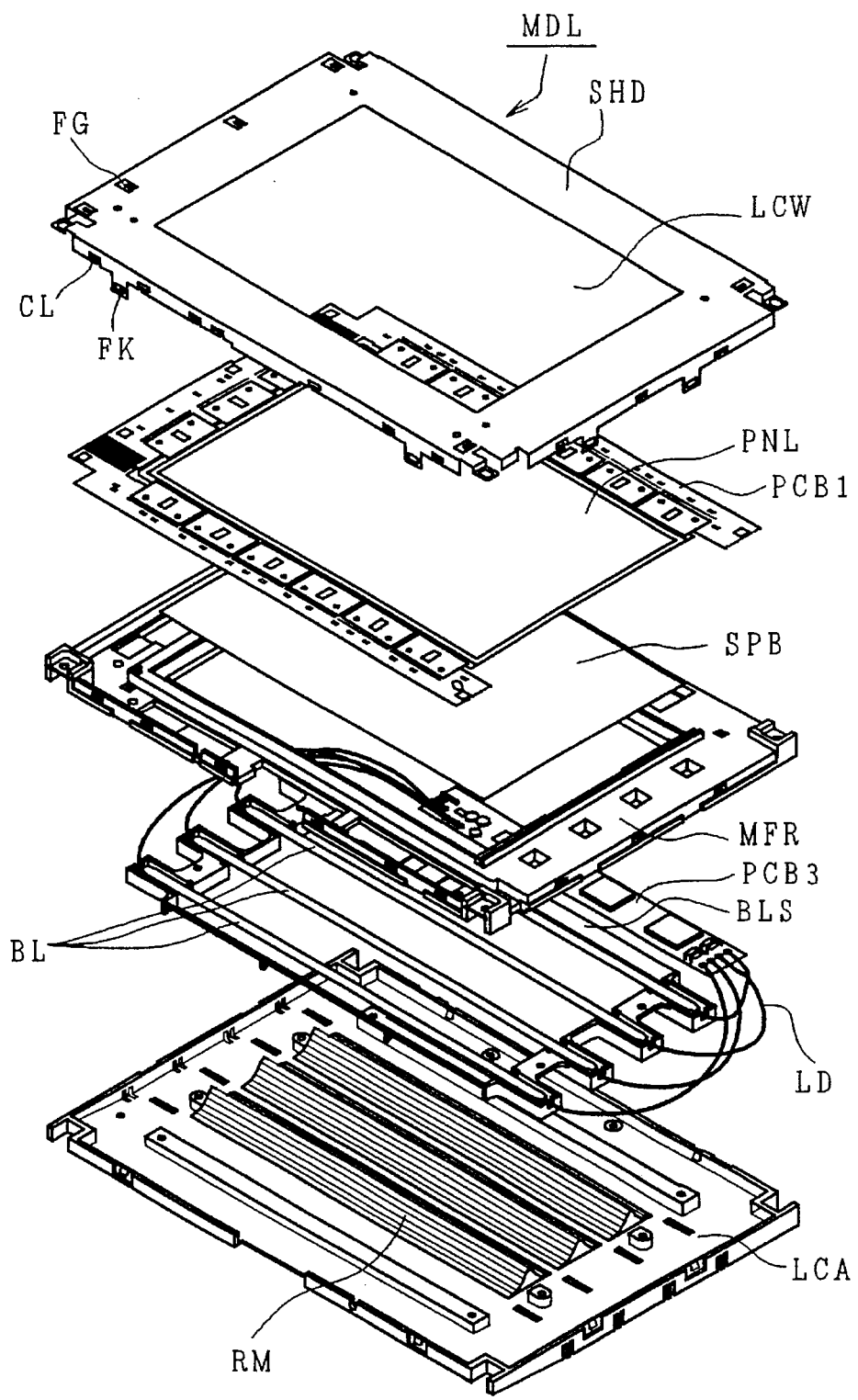
FIG. 16 is an exploded perspective view showing a liquid crystal display module.

FIG. 16 is an exploded perspective view showing a liquid crystal display module MDL.

Letters SHD designate a shield casing (=metal frame) made of a metal plate; letters LCW designate a liquid crystal display window; letters PNL designate a liquid crystal display panel; letters SPB designate an optical diffusion plate; letters MFR designate a middle frame; letters BL designate back lights; letters BLS designate a back light support; and letters LCA designate a lower casing. All of these members are stacked in vertical positions, as shown, to assemble a module MDL.

The module MDL is firmly secured by a claw CL and a hook FK formed on the shield case SHD.

The intermediate frame MFR is formed into the shape of frame to provide an opening corresponding to the display window LCW, and its frame portion is provided with bulges and recesses according to the shape and thickness of the dispersion board, backlight support BLS and various circuit components, as well as with openings for heat dissipation.

The lower case LCA also serves as a reflector for backlight and has reflection bulges corresponding to the fluorescent lamps BL for efficient reflection.

<<Display Panel PNL and Drive Circuit Board PCB1>>

Figure 17:
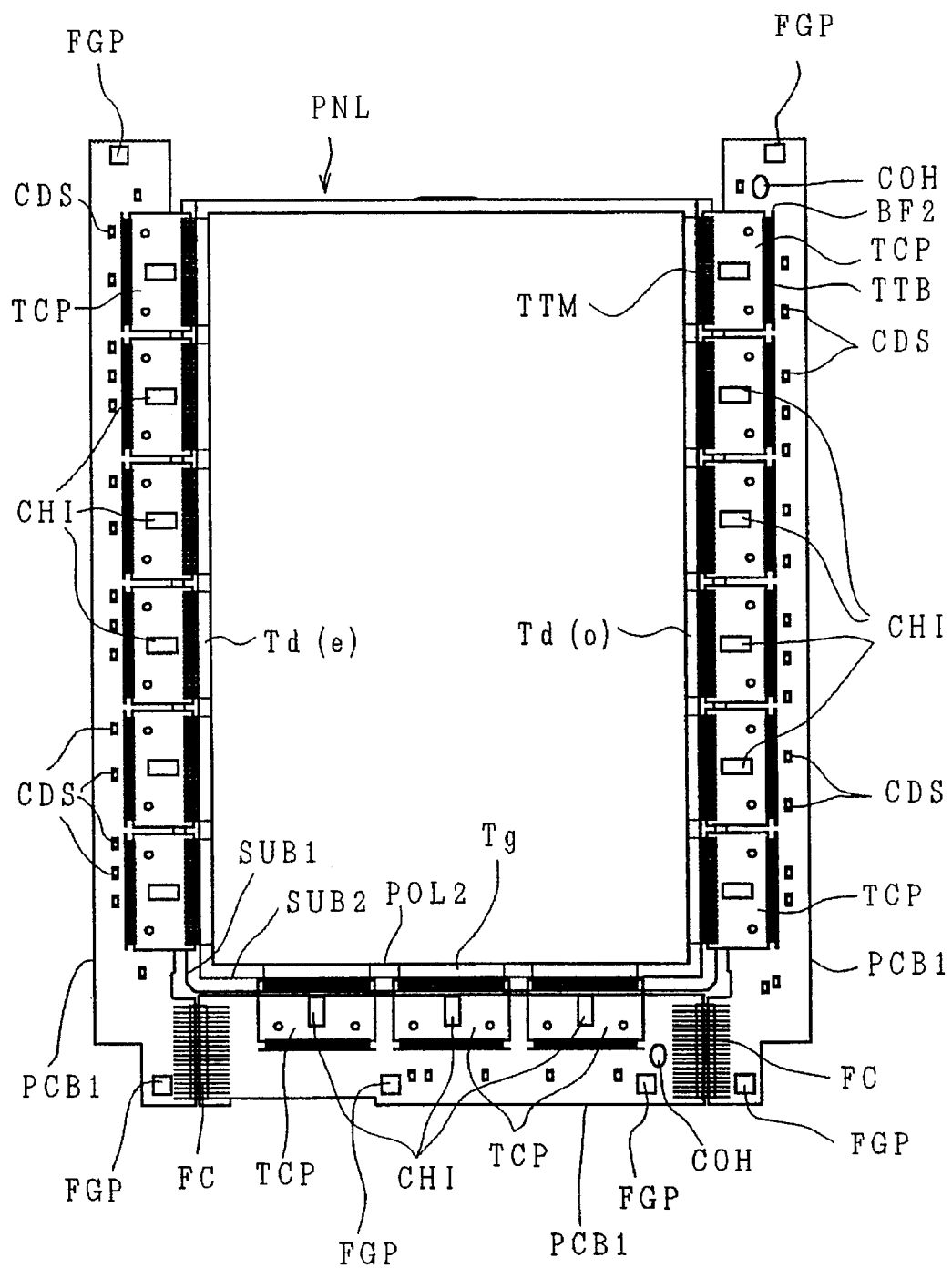
FIG. 17 is a upper side view showing the state, in which peripheral drive circuits are packaged in the liquid crystal display panel.

FIG. 17 is a top view showing the display panel PNL connected with the video signal drive circuits He, Ho and the vertical scanning circuit V.

Letters CHI designate drive IC chips (of which: the lower three are the drive IC chips at the vertical scanning circuit side whereas the righthand and lefthand six are the drive IC chips at the video signal drive circuit side) for driving the display panel PNL. Letters TCP designate tape carrier packages in which are packaged the driving IC chips CHI by the tape automated bonding method (TAB), as described hereinafter with reference to FIGS. 18 and 19, and letters PCB1 designate drive circuit substrates divided into three in which are individually implemented the tape carrier packages TCP and capacitors CDS. Denoted FGP is a frame ground pad, to which a spring-like fragment FG cut into the shield case SHD is soldered. A symbol FC represents a flat cable that provides an electrical connection between the lower side drive circuit board PCB1 and the left side drive circuit board PCB1 and also between the lower side drive circuit board PCB1 and the right side drive circuit board PCB1. The flat cable FC, as shown in the figure, consists of a plurality of lead wires (made of phosphor bronze plated with Sn) supported and sandwiched by striped polyethylene layer and polyvinyl alcohol layer.

<<TCP Connection Structure>>

FIG. 18 shows the cross-sectional structure of a tape carrier package TCP that consists of an integrated circuit chip CHI mounted on a flexible wiring board which provides the scanning signal drive circuit V and the video signal drive circuits He, Ho. FIG. 19 is a fragmentary cross section showing the tape carrier package TCP connected, in this example, to the video signal circuit terminal DTM of the liquid crystal display panel.

In the figure, TTB represents an input terminal and wiring portion of the integrated circuit CHI. TTM is an output terminal and wiring portion of the integrated circuit CHI.

These are made, for example, of Cu and their inner ends (usually called inner leads) are connected to the bonding pads PAD of the integrated circuit CHI by the so-called facedown bonding method. Outer ends of the terminals TTB and TTM (usually called outer leads) correspond to the input and output of the semiconductor integrated circuit chip CHIP, respectively, and are connected, as by solder, to the CRT/TFT conversion circuit and power supply circuit and through an anisotropic conductive film ACF to the liquid crystal display panel PNL. The package TCP is connected to the panel in such a way that its end portions cover the passivation film PSV1, which exposes the connection terminal DTM on the panel PNL side. Thus, the outer connection terminal DTM (GTM) is covered at least by the passivation film PSV1 or package TCP and therefore has a greater resistance against galvanic corrosion.

Designated BF1 is a base film made of polyimide; and SRS is a solder resist film that works as a mask to prevent excess solder from adhering to unwanted areas. The gap between the upper and lower glass substrates outside the seal pattern SL is protected by epoxy resin EPX after cleaning. Further, silicone resin SIL is filled between the package TCP and the upper substrate SUB2, thus providing multiple protection.

<<Drive Circuit Substrate PCB2>>

Figure 20:
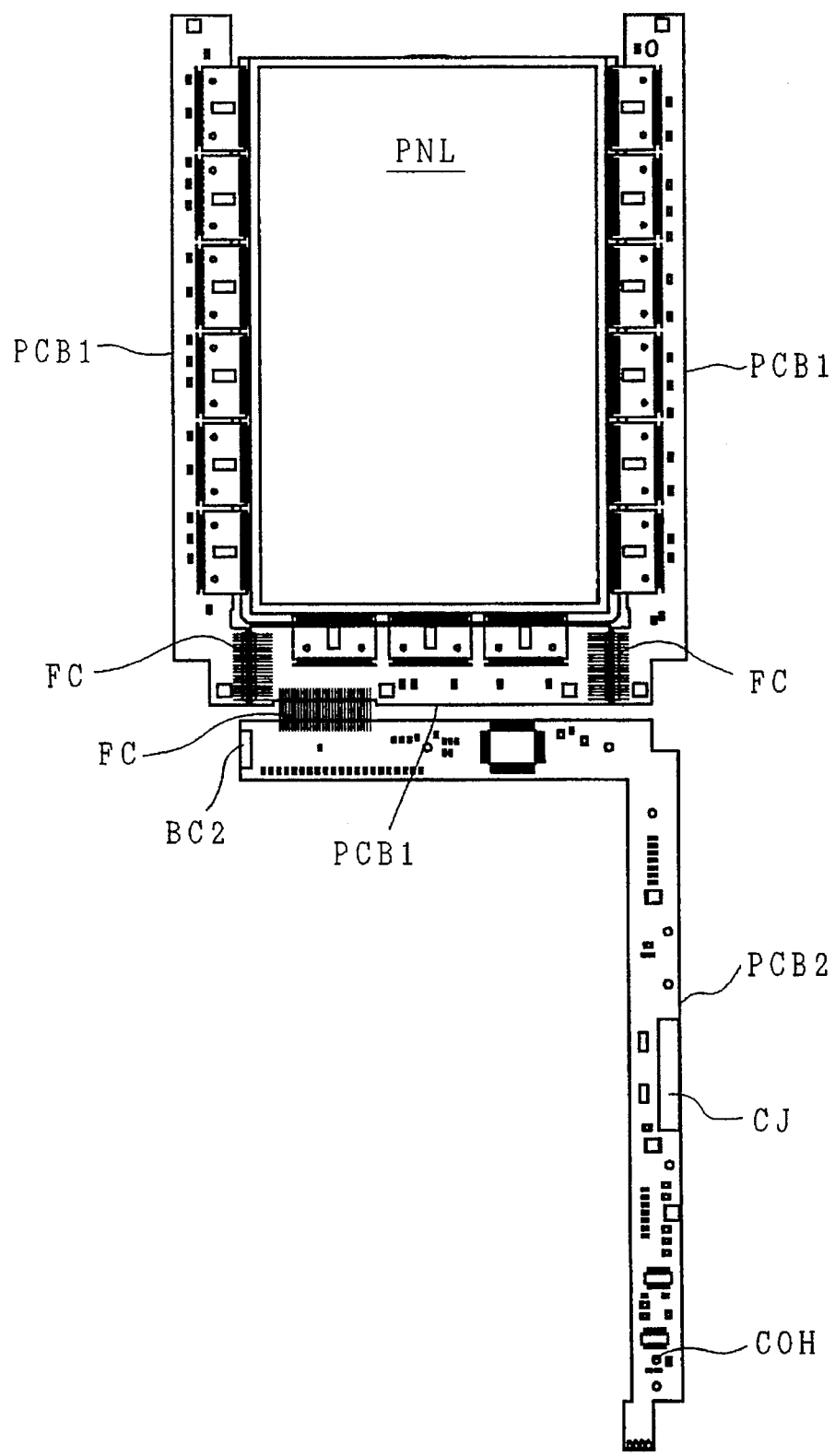
FIG. 20 is an upper side view showing the connection state between the peripheral drive circuit substrate (as viewed from the upper side) of the liquid crystal display and the drive circuit substrate (as viewed from the lower side) to be mounted on the middle frame.

The drive circuit substrate PCB2 of the liquid crystal display LCD to be held and mounted in the middle frame MFR is formed into an L-shape, as shown in FIG. 20, to implement electronic parts such as ICs, capacitors or resistors. In this drive circuit substrate PCB2, there are mounted a power supply circuit for achieving a plurality of divided stable voltage sources from one voltage source and a circuit including a circuit for converting data for CRT (i.e., Cathode Ray Tube) from a host (i.e., a higher-order operational processor) to data for the TFT liquid crystal display device. Letters CJ designate a connector connection portion to be connected with a not-shown connector to be connected with the outside. The drive circuit board PCB2 and the inverter circuit board PCB3 are electrically interconnected by a backlight cable passing through a connector hole provided in the intermediate frame MFR.

The drive circuit board PCB1 and the drive circuit board PCB2 are electrically connected to each other through a flexible flat cable FC. During assembly, the drive circuit board PCB2 is placed in overlapping contact with the back side of the drive circuit board PCB1 by bending the flat cable 180 degrees and is fit into a recess in the intermediate frame MFR.

[Effect of the Invention]

As apparent from the description thus far made, according to the method of manufacturing a liquid crystal display substrate according to the present invention, the disconnection or short-circuit can be repaired remarkably easily and reliably.

What is claimed is:

1. A method of manufacture of a transparent substrate for use in a liquid crystal display device, said transparent substrate including a plurality of pixel electrodes and a plurality of wiring strips disposed between said plurality of pixel electrodes on a surface thereof, said method of manufacture including a step of electrically connecting respective sides of an undesired open circuit in said plurality of wiring strips caused during substrate fabrication, said step of electrically connecting including forming an electro-conductive path between said respective sides of the undesired open circuit and one of said plurality of pixel electrodes adjacent thereto.

2. A method of manufacture according to claim 1, wherein said electro-conductive path is formed by placing electro-conductive material adjacent to said undesired open circuit and projecting a laser beam onto said electro-conductive material so that said electro-conductive material forms said electro-conductive path in a resultant chemical reaction.

3. A method of manufacture according to claim 2, wherein said electro-conductive material is in gas phase.

4. A method of manufacture according to claim 2, wherein said electro-conductive path is made of chromium.

5. A method of manufacture according to claim 2, wherein said electro-conductive path is made of molybdenum.

6. A method of manufacture according to claim 2, wherein said electro-conductive path is made of tungsten.

7. A method of manufacture according to claim 1, wherein said electro-conductive path is made of platinum.

* * * * *